US011370152B2

(12) United States Patent
Nishida et al.

(10) Patent No.: US 11,370,152 B2
(45) Date of Patent: Jun. 28, 2022

(54) ROTOR MANUFACTURING METHOD AND ROTOR MANUFACTURING APPARATUS

(71) Applicant: HONDA MOTOR CO., LTD., Tokyo (JP)

(72) Inventors: Atsushi Nishida, Wako (JP); Manabu Yazaki, Wako (JP); Keiichiro Kashiwabara, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 569 days.

(21) Appl. No.: 16/056,930

(22) Filed: Aug. 7, 2018

(65) Prior Publication Data

US 2019/0047189 A1 Feb. 14, 2019

(30) Foreign Application Priority Data

Aug. 8, 2017 (JP) ............................ JP2017-153570

(51) Int. Cl.

*B29C 45/13* (2006.01)
*B29C 45/53* (2006.01)
*B29C 45/14* (2006.01)
*H02K 15/03* (2006.01)

(Continued)

(52) U.S. Cl.

CPC ........ *B29C 45/13* (2013.01); *B29C 45/14065* (2013.01); *B29C 45/14639* (2013.01);

(Continued)

(58) Field of Classification Search

CPC ......... B29C 45/00; B29C 45/13; B29C 45/53; B29C 45/14639; B29C 45/14065;

(Continued)

(56) References Cited

U.S. PATENT DOCUMENTS

2005/0012243 A1* 1/2005 Saeki .................. B29C 45/1703 264/328.8
2008/0238219 A1 10/2008 Hoshino et al.
2013/0334910 A1* 12/2013 Takahashi ................ H02K 9/22 310/52

FOREIGN PATENT DOCUMENTS

CN 1575953 A 2/2005
CN 101490928 A 7/2009

(Continued)

OTHER PUBLICATIONS

Machine English Translation of Nakanishi Masaru, JP-2015192574-A, Retrieved from https://www.j-platpat.inpit.go.jp/p0200, on Mar. 8, 2021 (Year: 2015).*

(Continued)

*Primary Examiner* — Francisco W Tschen
*Assistant Examiner* — Edgaredmanuel Troche
(74) *Attorney, Agent, or Firm* — WHDA, LLP

(57) ABSTRACT

A rotor manufacturing method, which is method for manufacturing a rotor that includes a rotor core and a magnet inserted into a slot formed in the rotor core, includes a magnet-insertion step of inserting the magnet into the slot; and a fixing-material-injection step of injecting a fixing material into a space between an inner surface of the slot and the magnet from a plurality of fixing-material-injection portions of the slot. In the fixing-material-injection step, a time for starting injection of the fixing material into the slot is made to differ among the plurality of fixing-material-injection portions.

8 Claims, 13 Drawing Sheets

(51) Int. Cl.
*H02K 15/12* (2006.01)
*B29L 31/00* (2006.01)
*B29K 105/00* (2006.01)

(52) U.S. Cl.
CPC ............. *B29C 45/53* (2013.01); *H02K 15/03* (2013.01); *B29K 2105/0079* (2013.01); *B29K 2995/0008* (2013.01); *B29L 2031/7498* (2013.01); *H02K 15/12* (2013.01)

(58) Field of Classification Search
CPC .. B29C 2035/135; H02K 15/00; H02K 15/03; H02K 15/0012; B29K 2995/0008
USPC ....................................................... 264/272.2
See application file for complete search history.

(56) References Cited

FOREIGN PATENT DOCUMENTS

| | | | | |
|---|---|---|---|---|
| CN | 102804562 | A | | 11/2012 |
| CN | 103730993 | A | | 4/2014 |
| JP | 11-355985 | A | | 12/1999 |
| JP | 2008-245405 | A | | 10/2008 |
| JP | 2014036486 | A | | 2/2014 |
| JP | 2014-82807 | A | | 5/2014 |
| JP | 2015116078 | A | | 6/2015 |
| JP | 2015192574 | A | * | 11/2015 |
| JP | 2016123227 | A | | 7/2016 |

OTHER PUBLICATIONS

Office Action dated Mar. 26, 2019, issued in counterpart JP Application No. 2017-153570, with English translation (9 pages).

Office Action dated Nov. 10, 2020, issued in counterpart CN Application No. 201810896493.X (1 page).

Search Report dated Dec. 20, 2019, issued in counterpart CN Application No. 201810896493.X (2 pages).

Office Action dated Jan. 6, 2020, issued in counterpart CN Application No. 201810896493.X (16 pages).

* cited by examiner

ROTOR MANUFACTURING METHOD AND ROTOR MANUFACTURING APPARATUS

CROSS REFERENCES TO RELATED APPLICATIONS

The present application claims priority under 35 U.S.C. § 119 to Japanese Patent Application No. 2017-153570, filed Aug. 3, 2017, entitled "Rotor Manufacturing Method And Rotor Manufacturing Apparatus." The contents of this application are incorporated herein reference in their entirety.

BACKGROUND

1. Field

The present disclosure relates to a rotor manufacturing method and a rotor manufacturing apparatus.

2. Description of the Related Art

In recent years, vehicles in which a rotating electric machine (motor) for driving the vehicle is mounted, such as fuel-cell automobiles, hybrid automobiles, and electric automobiles, have been developed. In general, the rotating electric machine includes a stator, which has a coil, and a rotor. The rotor includes a magnet and is supported inside the stator so as to be rotatable around an axis. As the rotor, an interior permanent magnet (IPM) rotor, in which magnets are embedded by forming slots in a rotor core and inserting the magnets into the slots, is widely known. Usually, a magnet, which is inserted into a slot of a rotor core, is fixed to the rotor core by filling the space between the inner surface of the slot and the outer surface of the magnet with a fixing material, which is a resin material, and solidifying the fixing material.

It is necessary to accurately position the magnet in the slot for the purposes of, for example, adjusting a stress that a rotor core receives from the magnet when the rotor rotates and obtaining desirable magnetic characteristics. To achieve such purposes, methods for accurately positioning the magnet in the slot have been proposed (see, for example, Japanese Unexamined Patent Application Publication No. 2014-82807). Japanese Unexamined Patent Application Publication No. 2014-82807 describes a method of resin-sealing a laminated core. The method includes inserting permanent magnets into magnet insertion holes of a core body; pressing the core body with an upper die and a lower die in a direction where core pieces are laminated; and injecting resin to the magnet insertion holes from a resin reservoir provided in the upper die or the lower die via a runner formed in a removable cull plate and thereby fixing the permanent magnets. In the method, an end of the runner includes a plurality of resin injection holes with respect to the one magnet insertion hole, and the injected resin presses the permanent magnets inserted. In the magnet insertion holes to one side in a radial direction of each of the magnet insertion holes.

However, with the method described in Japanese Unexamined Patent Application Publication No. 2014-82807, when injecting a fixing material into a slot, a magnet can be moved only in one direction in the slot. Therefore, the method has a problem in that it is difficult to fix the magnet at an appropriate position.

SUMMARY

The present application describes a rotor manufacturing method and a rotor manufacturing apparatus with which a magnet can be fixed at any appropriate position.

A rotor manufacturing method according to the present disclosure is a method for manufacturing a rotor (for example, a rotor 20 in an embodiment) that includes a rotor core (for example, a rotor core 21 in the embodiment) and a magnet (for example, a magnet 23 in an embodiment) inserted into a slot (for example, a slot 31 in the embodiment) formed in the rotor core. The method includes a magnet-insertion step (for example, a magnet-insertion step S11 in the embodiment) of inserting the magnet into the slot, and a fixing-material ejection step (for example, a fixing-material-injection step S13 in the embodiment) of injecting a fixing material (for example, a fixing material 41 in the embodiment) into a space between an inner surface of the slot and the magnet from a plurality of fixing-material-injection portions opened to the space in the slot and in preset respective locations away from one another (for example, fixing-material-injection portions 43A and 43B in the embodiment) of the slot. In the fixing-material-injection step, at least one of a time for starting injection of the fixing material into the slot, a speed at which the fixing material is injected into the slot, and an amount of the fixing material injected into the slot is made to differ among the plurality of fixing-material-injection portions.

With the method, in the fixing-material-injection step, by injecting the fixing material from the fixing-material-injection portions, the magnet can be pushed by the fixing material in the slot, and the magnet can be moved so as to be separated from the fixing-material-injection portions in the slot. Therefore, for example, in a case where a pair of fixing-material-injection portions are provided, when the fixing material is injected in the same way from the pair of fixing-material-injection portions, the magnet is pushed in the same way by the fixing material injected from the fixing-material-injection portions. Thus, the magnet can be moved in a direction perpendicular to the direction in which the pair of fixing-material-injection portions are arranged. When at least one of the time for injecting the fixing material, the speed at which the fixing material is injected, and the amount of fixing material injected is made to differ between the pair of fixing-material-injection portions and the fixing material is injected from the pair of fixing-material-injection portions, a force with which the magnet is pushed by the fixing material injected from one of the fixing-material-injection portions and a force with which the magnet is pushed by the fixing material injected from the other fixing-material-injection portion differ from each other. Thus, the magnet can be moved in both of the direction perpendicular to the direction in which the pair of fixing-material-injection portions are arranged and the direction in which the pair of fixing-material-injection portions are arranged. Accordingly, the magnet can be fixed at any appropriate position.

In the rotor manufacturing method, preferably, in the fixing-material-injection step, the fixing material is injected from a first one of the fixing-material-injection portions by using a first fixing-material-supply unit (a first fixing-material-supply device; for example, a first plunger 111A in an embodiment) that supplies the fixing material to the first one of the fixing-material-injection portions, and the fixing material is injected from a second one of the fixing-material-injection portions by using a second fixing-material-supply unit (a second fixing-material-supply device; for example, a second plunger 111B in the embodiment) that supplies the fixing material to the second one of the fixing-material-injection portions.

In this case, by independently controlling the first fixing-material-supply unit and the second fixing-material-supply unit, in the fixing-material-injection step, at least one of the time for starting injection of the fixing material, the speed at which the fixing material is injected, and the amount of the fixing material injected can be made to differ between the first one of the fixing-material-injection portions and the second one of the fixing-material-injection portions. Accordingly, the magnet can be easily fixed at any appropriate position.

In the rotor manufacturing method, preferably, in the fixing-material-injection step, on the basis of a pressure value of the fixing material in one of the fixing-material-injection portions, a time for starting injection of the fixing material from another of the fixing-material-injection portions is determined.

In this case, because the pressure value of the fixing material in one of the fixing-material-injection portions depends on the amount of the fixing material injected from the one of the fixing-material-injection portions, the repeatability of the fixing-material-injection step can be improved. Accordingly, it is possible to manufacture rotors with small variations.

In the rotor manufacturing method, preferably, in the fixing-material-injection step, after injection of the fixing material from one of the fixing-material-injection portions is complete, injection of the fixing material from another of the fixing-material-injection portions is started.

In this case, before injecting the fixing material from the other of the fixing-material-injection portions, a region in the slot near the one of the fixing-material-injection portions can be filled with the fixing material by injecting the fixing material from the one of the fixing-material-injection portions, and the magnet can be maximally moved in the slot in the direction in which the one of the fixing-material-injection portions and the other of the fixing-material-injection portions are arranged. Thus, when the fixing material is injected from the other of the fixing-material-injection portions, due to the presence of the fixing material that fills the region in the slot near the one of the fixing-material-injection portions, movement of the magnet in the direction in which the one of the fixing-material-injection portions and the other of the fixing-material-injection portions are arranged is restrained. Thus, the magnet can be fixed in a state in which the magnet is in close contact with the inner surface of the slot in the direction in which the one of the fixing-material-injection portions and the other of the fixing-material-injection portions are arranged.

In the rotor manufacturing method, preferably, in the fixing-material-injection step, after starting injection of the fixing material from one of the fixing-material-injection portions, injection of the fixing material from another of the fixing-material-injection portions is started with a time lag, while continuing injection of the fixing material from the one of the fixing-material-injection portions.

In this case, after injection of the fixing material from the one of the fixing-material-injection portions is started and before the magnet is maximally moved in the slot in the direction in which the one of the fixing-material-injection portions and the other of the fixing-material-injection portions are arranged, the fixing material can be injected from the other of the fixing-material-injection portions. Thus, the magnet can be fixed at any appropriate position in the direction in which the one of the fixing-material-injection portions and the other of the fixing-material-injection portions are arranged.

In the rotor manufacturing method, preferably, in the fixing-material-injection step, lengths of fixing material channels (for example, fixing material channels 216A and 216B in an embodiment) extending from a fixing-material-supply unit (for example, a plunger 111 in the embodiment) to the fixing-material-injection portions are made to differ among the fixing-material-injection portions, the fixing-material-supply unit supplying the fixing material to the fixing-material-injection portions.

In this case, because pressure loss differs among the fixing material channels, least one of the speed at which the fixing material is injected and the amount of the fixing material injected can be made to differ among the plurality of fixing-material-injection portions. Accordingly, by appropriately setting the lengths of the fixing material channels, the magnet can be easily fixed at any appropriate position.

In the rotor manufacturing method, preferably, in the fixing-material-injection step, cross-sectional areas of fixing material channels (for example, fixing material channels 316A and 316B in an embodiment) extending from a fixing-material-supply unit (for example, a plunger 111 in the embodiment) to the fixing-material-injection portions are made to differ among the fixing-material-injection portions, the fixing-material-supply unit supplying the fixing material to the fixing-material-injection portions.

In this case, because pressure loss differs among the fixing material channels, at least one of the speed at which the fixing material is injected and the amount of the fixing material injected can be made to differ among the plurality of fixing-material-injection portions. Accordingly, by appropriately setting the cross-sectional areas of the fixing material channels, the magnet can be easily fixed at any appropriate position.

A rotor manufacturing apparatus according to the present disclosure is an apparatus (for example, a manufacturing apparatus 100, 200, or 300 in an embodiment) for manufacturing a rotor (for example, a rotor 20 in the embodiment) that includes a rotor core (for example, a rotor core 21 in the embodiment) and a magnet (for example, a magnet 23 in the embodiment) inserted into a slot (for example, a slot 31 in the embodiment) formed in the rotor core. The apparatus includes a fixing-material-injection unit (a fixing-material-injection device; for example, a fixing-material-injection unit (device) 110, 210, or 310 in the embodiment) that injects a fixing material (for example, a fixing material 41 in the embodiment) into a space between an inner surface of the slot and the magnet from a plurality of fixing-material-injection portions (for example, fixing-material-injection portions 43A and 43B in the embodiment) of the slot. The fixing-material-injection unit makes at least one of a time for starting injection of the fixing material, a speed at which the fixing material is injected, and an amount of the fixing material injected differ among the plurality of fixing-material-injection portions.

With the apparatus, because the fixing-material-injection unit injects the fixing material from the fixing-material-injection portions, the magnet can be pushed by the fixing material in the slot and the magnet can be moved so as to be separated from the fixing-material-injection portions in the slot. Therefore, for example, in a case where a pair of fixing-material-injection portions are provided, when the fixing material is injected in the same way from the pair of fixing-material-injection portions, the magnet is pushed in the same way by the fixing material injected from the fixing-material-injection portions. Thus, the magnet can be moved in a direction perpendicular to the direction in which the pair of fixing-material-injection portions are arranged. When at least one of the time for injecting the fixing material, the speed at which the fixing material is injected, and the amount of fixing material injected is made to differ between the pair of fixing material injection portions and the fixing material is injected from the pair of fixing-material-injection portions, a force which the magnet is pushed by the fixing material injected from one of the fixing-material-injection portions and a force with which the magnet is pushed by the fixing material injected from the other fixing-material-injection portion differ from each other. Thus, the magnet can be moved in both of the direction perpendicular to the direction in which the pair of fixing-material-injection portions are arranged and the direction in which the pair of fixing-material-injection portions are arranged. Accordingly, the magnet can be fixed at any appropriate position.

In the rotor manufacturing apparatus, preferably, the fixing-material-injection unit includes a first fixing-material-supply unit (for example, a first plunger 111A in an embodiment) that supplies the fixing material to a first one of the fixing-material-injection portions, and a second fixing-material-supply unit (for example, a second plunger 111B in the embodiment) that supplies the fixing material to a second one of the fixing-material-injection portions.

In this case, by independently controlling the first fixing-material-supply unit and the second fixing-material-supply unit, the fixing-material-injection unit can make at least one of the time for starting injection of the fixing material, the speed at which the fixing material is injected, and the amount of the fixing material injected differ between the first one of the fixing-material-injection portions and the second one of the fixing-material-injection portions. Accordingly, the magnet can be easily fixed at any appropriate position.

In the rotor manufacturing apparatus, preferably, the fixing-material-injection unit includes a fixing-material-supply unit (for example, a plunger 111 in an embodiment) that supplies the fixing material to both of a first one of the fixing-material-injection portions and a second one of the fixing-material-injection portions.

In this case, the number of fixing-material-supply units included in the fixing-material-injection unit can be reduced, compared with a case where the fixing-material-injection unit includes a fixing-material-supply unit for supplying the fixing material to the first one of the fixing-material-injection portions and another fixing-material-supply unit for supplying the fixing material to the second one of the fixing-material-injection portions. Accordingly, it is possible to reduce the number of components of the fixing-material-injection unit and to provide the rotor manufacturing apparatus at a low cost.

In the rotor manufacturing apparatus, preferably, the fixing-material-injection unit includes a channel member (for example, a filling die 215 in an embodiment) in which fixing material channels (for example, fixing material channels 216A and 216B in the embodiment) extending from the fixing-material-supply unit to the first one of the fixing-material-injection portions and the second one of the fixing-material-injection portions are formed, and lengths of the fixing material channels differ among the fixing-material-injection portions.

In this case, the time for supplying the fixing material from the fixing-material-supply unit to the fixing-material-injection portion can be made to differ among the plurality of fixing-material-injection portions. Moreover, because pressure loss differs among the fixing material channels, at least one of the speed at which the fixing material is injected and the amount of the fixing material injected can be made to differ among the plurality of fixing-material-injection portions. Accordingly, by appropriately setting the lengths of the fixing material channels, the magnet can be easily fixed at any appropriate position.

In the rotor manufacturing apparatus, preferably, the fixing-material-injection unit includes a channel member (for example, a filling die 315 in an embodiment) in which fixing material channels (for example, fixing material channels 316A and 316B in the embodiment) extending from the fixing-material-supply unit to the first one of the fixing-material-injection portions and the second one of the fixing-material-injection portions are formed, and cross-sectional areas of the fixing material channels differ among the fixing-material-injection.

In this case, the time for supplying the fixing material from the fixing-material-supply unit to the fixing-material-injection portion can be made to differ among the plurality of fixing-material-injection portions. Moreover, because pressure loss differs among the fixing material channels, the speed at which the fixing material is injected and the amount of the fixing material injected can be made to differ among the plurality of fixing-material-injection portions. Accordingly, by appropriately setting the cross-sectional areas of the fixing material channels, the magnet can be easily fixed at any appropriate position.

With the rotor manufacturing method and the rotor manufacturing apparatus according to the present disclosure, the magnet can be fixed at any appropriate position.

DESCRIPTION OF THE PREFERRED EMBODIMENTS

Figure 1:
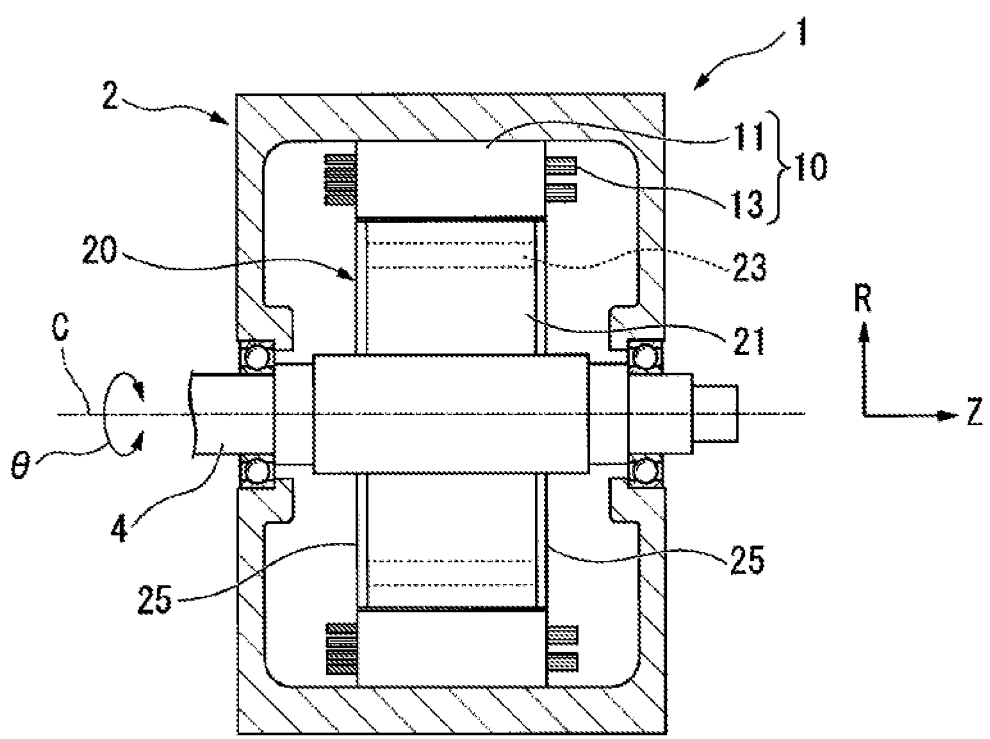
FIG. 1 is a sectional view illustrating the overall structure of a rotating electric machine.

Hereinafter, embodiments of the present disclosure will be described with reference to the drawings. In the drawings, some elements are scaled differently, as necessary. Elements that have the same or similar functions will be denoted by the same numerals, and redundant descriptions of such elements may be omitted.

First, a rotating electric machine 1 including a rotor 20, which is obtained by using a rotor manufacturing method and a rotor manufacturing apparatus according to an embodiment, will be described. FIG. 1 is a sectional view illustrating the overall structure of the rotating electric machine 1 including the rotor 20, which is obtained by using the rotor manufacturing method and the rotor manufacturing apparatus according to a first embodiment. The rotating electric machine 1 is, for example, a traction motor mounted in a vehicle such as a hybrid automobile or an electric automobile. Referring to FIG. 1, the rotating electric machine 1 includes a housing 2, a stator 10, the rotor 20, and a shaft 4. The housing 2 contains the stator 10 and the rotor 20 and rotatably supports the shaft 4. The stator 10, the rotor 20, and the shaft 4 have a common axis C. In the following description, a direction in which the axis C extends will be referred to as the axial direction, a direction perpendicular to the axis C will be referred to as the radial direction, and a direction around the axis C will be referred to as the circumferential direction. In the figures, arrow Z represents the axial direction, arrow R represents the radial direction, and arrow θ represents the circumferential direction.

The stator 10 includes a stator core 11 and coils 13 for a plurality of phases (for example, U-phase, V-phase, and W-phase) attached to the stator core 11. The stator 10 generates a magnetic field as an electric current flows through the coils 13. The stator core has a cylindrical shape extending in the axial direction. The stator core 11 is formed by, for example, stacking a plurality of electric steel sheets in the axial direction.

The rotor 20 is disposed inside of the stator 10 in the radial direction. The rotor 20 includes a rotor core 21, magnets 23 attached to the rotor core 21, and end plates 25 disposed in contact with both end surfaces of the rotor core 21 in the axial direction. The rotor core 21 has a cylindrical shape that uniformly extends in the axial direction and is disposed so as to face the inner peripheral surface of the stator core 11. The rotor core 21 is formed by, for example, stacking a plurality of electric steel sheets in the axial direction. The shaft 4 is inserted into the rotor core 21 and fixed by, for example, press fitting. Thus, the rotor core 21 can rotate together with the shaft 4 around the axis C. The rotor 20 is rotated as a magnetic field, which is generated by the stator 10, attracts or repels the magnets 23.

Figure 2:
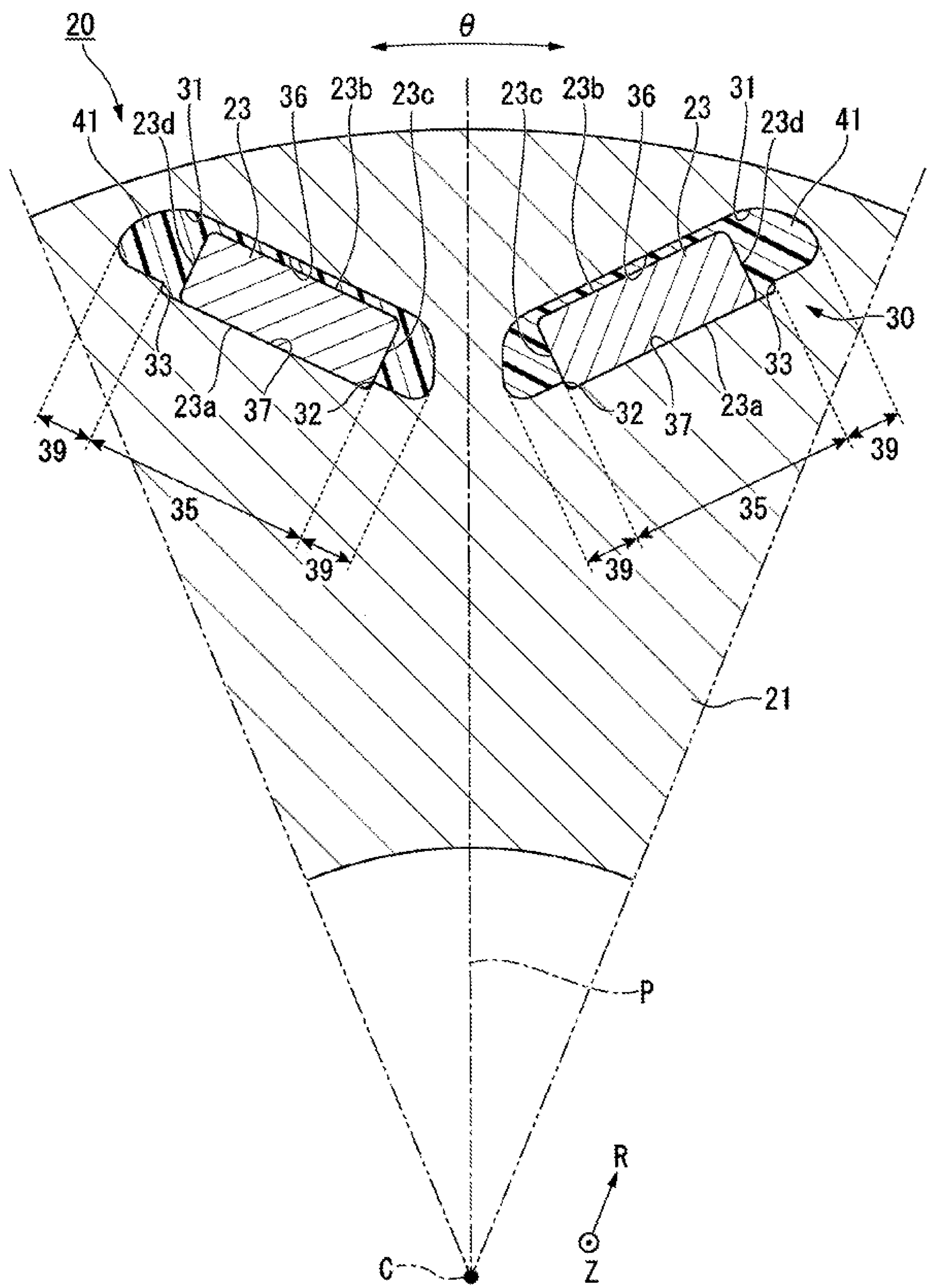
FIG. 2 is a partial sectional view of a rotor when seen in the axial direction.

FIG. 2 is a partial sectional view of the rotor 20 when seen in the axial direction. Referring to FIG. 2, a slot group 30, to which the magnets 23 are attached, is formed in each of angular regions of the rotor core 21. The slot group 30 includes a pair of slots 31. One magnet 23 is disposed in each slot 31. In each slot group 30, the pair of slots 31 are formed with a distance therebetween in the circumferential direction. The slots 31 extend through the rotor core 21 in the axial direction. When seen in the axial direction, the pair of slots 31 are symmetrical about a straight line P, which extends in a radial direction and passes through the center of the slot group 30.

Each of the slots 31 includes a magnet placement portion 35, in which the magnet 23 is disposed, and a pair of flux barriers 39, between which the magnet placement portion 35 is located. The magnet placement portion 35 has a rectangular shape when seen in the axial direction. The magnet placement portion 35 is formed so that the longitudinal direction and the transversal direction thereof when seen in the axial direction are inclined with respect to the straight line P. To be specific, in each slot group 30, the magnet placement portions 35 of the pair of slots 31, each of which has a first end portion and a second end portion in the longitudinal direction when seen in the axial direction, are disposed in such a way that the first end portions face each other in the circumferential direction with the straight line P therebetween and the first end portions are located inside in the radial direction of second end portions. The magnet placement portions 35 each include an outer wall 36, which corresponds to one of a pair of long sides when seen in the axial direction and faces inward in the radial direction, and an inner wall 37, which corresponds to the other long side and faces the outer wall 36.

The pair of flux barriers 39 suppress magnetic flux leakage from the magnet 23 to the rotor core 21. When seen in the axial direction, the pair of flux barriers 39 are disposed on both sides of the magnet placement portion 35 in the longitudinal direction of the magnet placement portion 35. The pair of flux barriers 39 protrude from the magnet placement portion 35 in the longitudinal direction of the magnet placement portion 35 when seen in the axial direction. Thus, in each slot group 30, the pair of slots 31 are disposed in a V-shape that opens outward in the radial direction when seen in the axial direction. In the transversal direction of the magnet placement portion 35 when seen in the axial direction, the pair of flux barriers 39 are smaller than the magnet placement portion 35. The inner surfaces of the pair of flux barriers 39 are continuous with the outer wall 36 of the magnet placement portion 35 and are connected to the inner wall 37 of the magnet placement portion 35 via first and second stepped surfaces 32 and 33. Each of the first and second stepped surfaces 32 and 33 perpendicularly intersects the inner wall 37. The first stepped surface 32 is connected to an inner edge of the inner wall 37 in the radial direction. The second stepped surface 33 is connected to an outer edge of the inner wall 37 in the radial direction and faces the first stepped surface 32.

The magnet 23 is a rare-earth magnet. Examples of a rare-earth magnet include a neodymium magnet, a samarium-cobalt magnet, and a praseodymium magnet. The magnet 23 has a rectangular shape when seen in the axial direction and uniformly extends in the axial direction. The dimension of the magnet 23 in the axial direction is substantially the same as that of the rotor core 21. The magnet 23 has a rectangular shape smaller than that of the magnet placement portion 35 of the slot 31 when seen in the axial direction. To be specific, the long side of the magnet 23 when seen in the axial direction is shorter than the long side of the magnet placement portion 35 when seen in the axial direction and is longer than the short side of the magnet placement portion 35 when seen in the axial direction. The short side of the magnet 23 when seen in the axial direction is shorter than the short side of the magnet placement portion 35 when seen in the axial direction. The magnet 23 is magnetized in the transversal direction of the magnet 23 when seen in the axial direction. In the following description of the magnet 23, the term "width direction" refers to a direction perpendicular to the magnetized direction of the magnet 23 when seen in the axial direction. That is, the width direction of the magnet 23 coincides with the longitudinal direction of the magnet 23 when seen in the axial direction.

The magnet 23 has a first side surface 23*a*, which corresponds to one of a pair of long sides when seen in the axial direction and faces the inner wall 37 of the magnet placement portion 35; a second side surface 23*b*, which corresponds to the other long side, faces in a direction opposite to the first side surface 23*a*, and faces the outer wall 36 of the magnet placement portion 35; a third side surface 23*c*, which corresponds to one of a pair of short sides when seen in the axial direction and faces the first stepped surface 32 of the slot 31; and a fourth side surface 23*d*, which corresponds to the other short side, faces in a direction opposite to the third side surface 23*c*, and faces the second stepped surface 33 of the slot 31. The magnet 23 is disposed in an inner part of the magnet placement portion 35 in the radial direction. To be specific, the magnet 23 is disposed in such a way that the first side surface 23*a* is in surface-contact with the inner wall 37 of the magnet placement portion 35. Moreover, in the present embodiment, the magnet 23 is disposed in such a way that the third side surface 23*c* is in contact with the first stepped surface 32 of the slot 31.

The magnet 23 is fixed to the rotor core 21 by filling the slot 31 with a fixing material 41. The fixing material 41 is a thermoplastic resin. Substantially the entirety of the inside of the slot 31 is filled with the fixing material 41. The fixing material 41 is interposed at least between a part of the magnet 23 facing outward in the radial direction (that is, the second side surface 23*b* and the fourth side surface 23*d*) and the inner surface of the slot 31. The fixing material 41 is formed by injecting and solidifying a thermoplastic resin. Preferably, the thermoplastic resin is, for example, a liquid crystal polymer (LCP).

Figure 3:
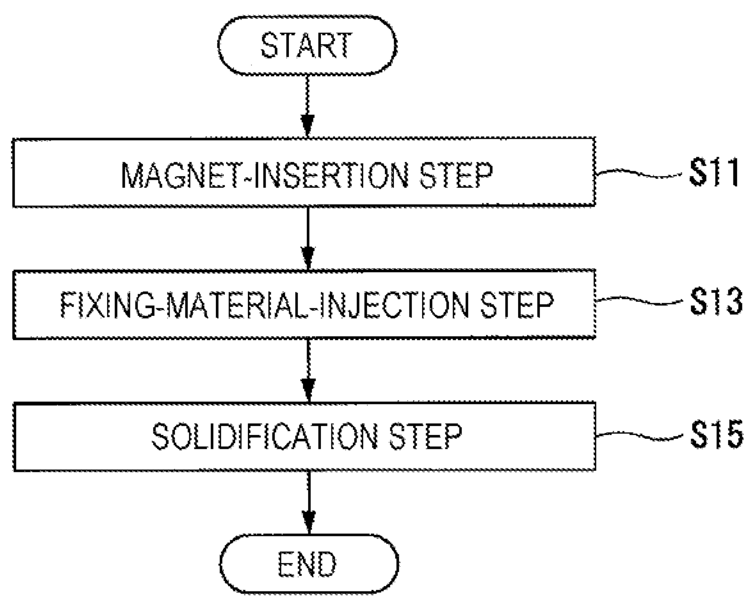
FIG. 3 a flowchart of a rotor manufacturing method according to a first embodiment.

Next, a rotor manufacturing method and a rotor manufacturing apparatus 100 for manufacturing the rotor 20 will be described. FIG. 3 is a flowchart of the rotor manufacturing method according to the first embodiment. Referring to FIG. 3, the rotor manufacturing method according to the first embodiment includes a magnet-insertion step S11, a fixing-material-injection step S13, and a solidification step S15. Each of the steps described below is simultaneously performed in the same way on all of the slots 31 of the rotor core 21. Accordingly, each of the steps performed on one of the slots 31 of the rotor core 21 will be described below. First, an outline of the manufacturing apparatus 100 used in the rotor manufacturing method according to the present embodiment will be described with reference to the drawings. Then, the manufacturing method will be described in detail.

Figure 4:
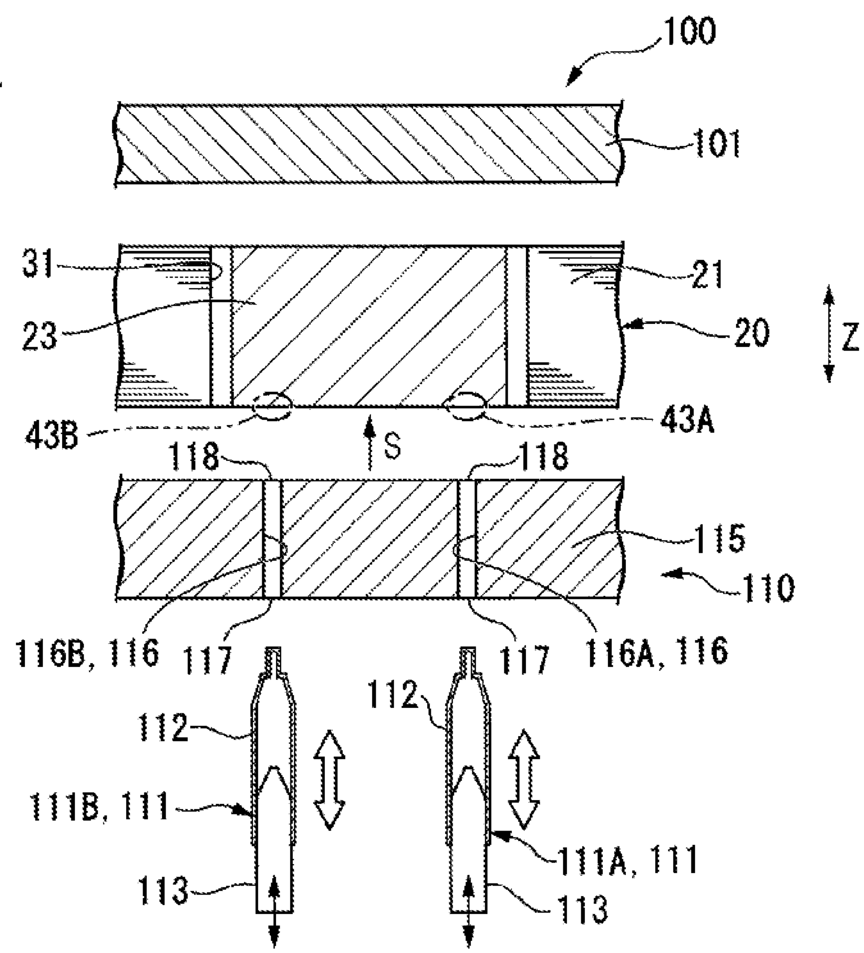
FIG. 4 is a schematic side sectional view of a rotor manufacturing apparatus according to the first embodiment.

FIG. 4 is a schematic side sectional view of the rotor manufacturing apparatus 100 for manufacturing a rotor according to the first embodiment. The rotor manufacturing apparatus 100 according to the first embodiment includes a core support unit 101 and a fixing-material-injection unit 110. The core support unit 101 is a base for supporting the rotor core 21. The core support unit 101 can support the rotor core 21 in a state in which the rotor core 21 is accurately positioned in the radial direction and the circumferential direction.

The fixing-material-injection unit 110 injects the fixing material 41 into the slot 31 of the rotor core 21, which is supported by the core support unit 101. The fixing-material-injection unit 110 includes first and second plungers 111A and 111B and a filling die 115. The fixing-material-injection unit 110 injects the fixing material 41 from a plurality of fixing-material-injection portions 43A and 43B (see FIG. 5) of the slot 31.

Figure 5:
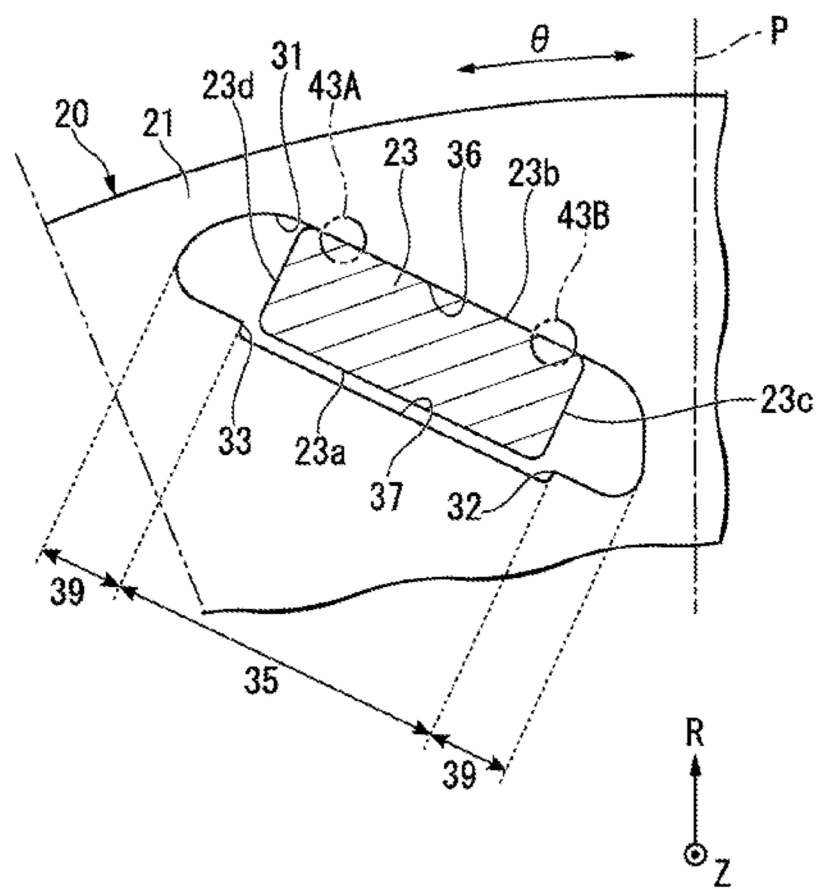
FIG. 5 is a partial plan view a rotor core when seen in the direction of arrow S in FIG. 4.

FIG. 5 is a partial plan view of the rotor core 21 when seen in the direction of arrow S in FIG. 4. FIG. 5 illustrates a state in which the magnet 23 is disposed in the slot 31 and the fixing material 41 has not been injected into the slot 31. Referring to FIG. 5, one pair of fixing-material-injection portions 43A and 43B are set for each slot 31. The pair of fixing-material-injection portions 43A and 43B are set at positions that are in one end opening of the slot 31 and that overlap the outer wall 36 of the magnet placement portion 35. The pair of fixing-material-injection portions 43A and 43B are arranged with a distance therebetween in the longitudinal direction of the magnet placement portion 35 when seen in the axial direction. Hereinafter, one of the pair of fixing-material-injection portions 43A and 43B that is located outside in the radial direction will be referred to as a first fixing-material-injection portion 43A, and the other fixing-material-injection portion 43B that is located inside in the radial direction will be referred to as a second fixing-material-injection portion 43B.

Referring to FIG. 4, the first and second plungers 111A and 111B eject the fixing material 41 that has been heated and softened and fill the slot 31 of the rotor core 21 with the fixing material 41. Each of the first and second plungers 111A and 111B includes a cylinder 112 and a piston 113. The cylinder 112 has a cylindrical shape and a predetermined volume, and the fixing material 41 is supplied to the inside of the cylinder 112 through a supply passage (not shown). The piston 113 can be slid in the cylinder 112 by, for example, using a hydraulic actuator (not shown). The first and second plungers 111A and 111B each eject the fixing material 41 as the piston 113 slides in the cylinder 112. The first plunger 111A supplies the fixing material 41 to the first fixing-material-injection portion 43A, and the second plunger 111B supplies the fixing material 41 to the second fixing-material-injection portion 43B.

The filling die 115 can be moved, by using a hydraulic actuator or the like (not shown), in the axial direction of the rotor core 21 in a region on a side of the rotor core 21 opposite to the side on which the core support unit 101 is located. When injecting the fixing material 41, the filling die 115 is brought into contact with an end surface of the rotor core 21 in the axial direction and is pressed against the end surface with a predetermined pressing force so that the filling die 115 does not separate from the rotor core 21 (so-called "clamping").

Fixing material channels 116 are formed in the filling die 115. The fixing material channels 116 each have a connection hole 117, which is one end opening, and a hole 113, which is the other end opening. When injecting the fixing material 41, ejection ports at the tips of the plungers 111 are connected to the connection holes 117. The filling holes 118 open at positions facing an end surface of the rotor 21 in the axial direction. The filling holes 118 are formed at positions corresponding to the fixing-material-injection portions 43A and 43B of the slot 31 of the rotor core 21. That is, the number of the fixing material channels 116 is the same as the number of the fixing-material-injection portions 43A and 43B. In the present embodiment, the fixing material channels 116 include a first fixing-material channel 116A, which extends from the first plunger 111A to the first fixing-material-injection portion 43A, and a second fixing material channel 116B, which extends from the second plunger 111B to the second fixing-material-injection portion 43B. The fixing material 41 ejected from the first plunger 111A flows through the first fixing-material channel 116A. The fixing material 41 ejected from the second plunger 111B flows through the second fixing material channel 116B. The length of the first fixing-material channel 116A is the same as that of the second fixing material channel 116B. The cross-sectional area of the first fixing-material channel 116A is the same as that of the second fixing material channel 116B.

Figure 6:
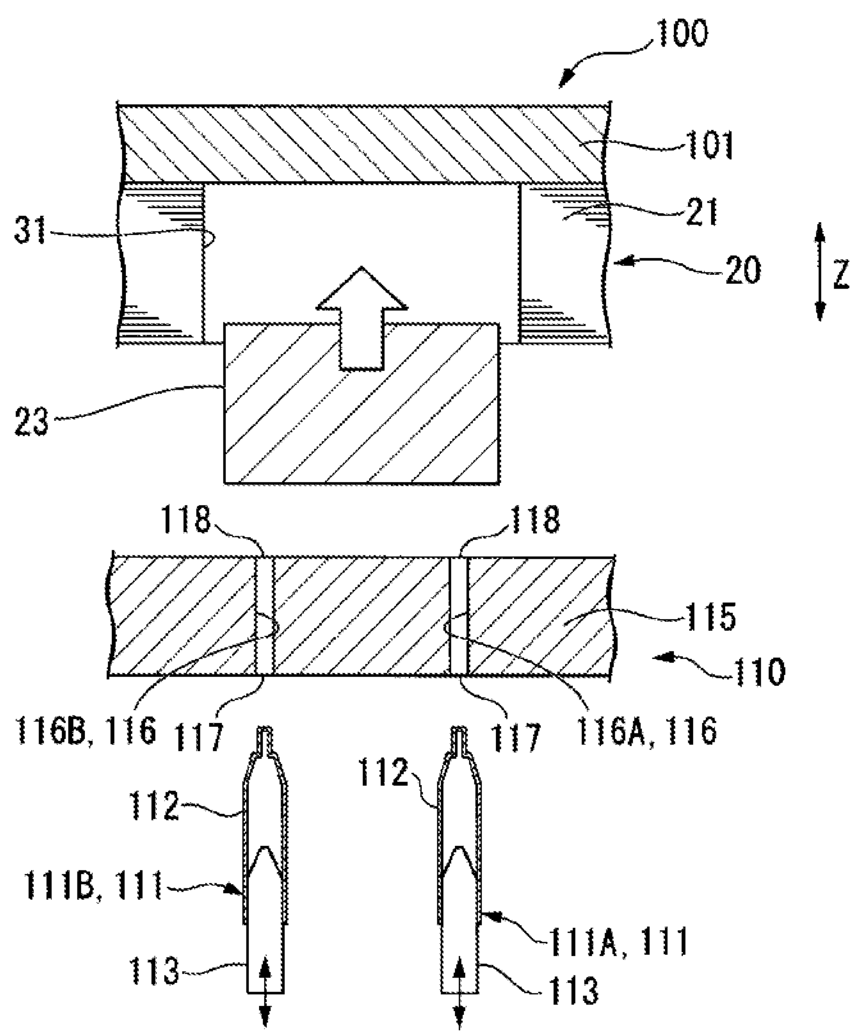
FIG. 6 illustrates the rotor manufacturing method according to the first embodiment.
Figure 7:
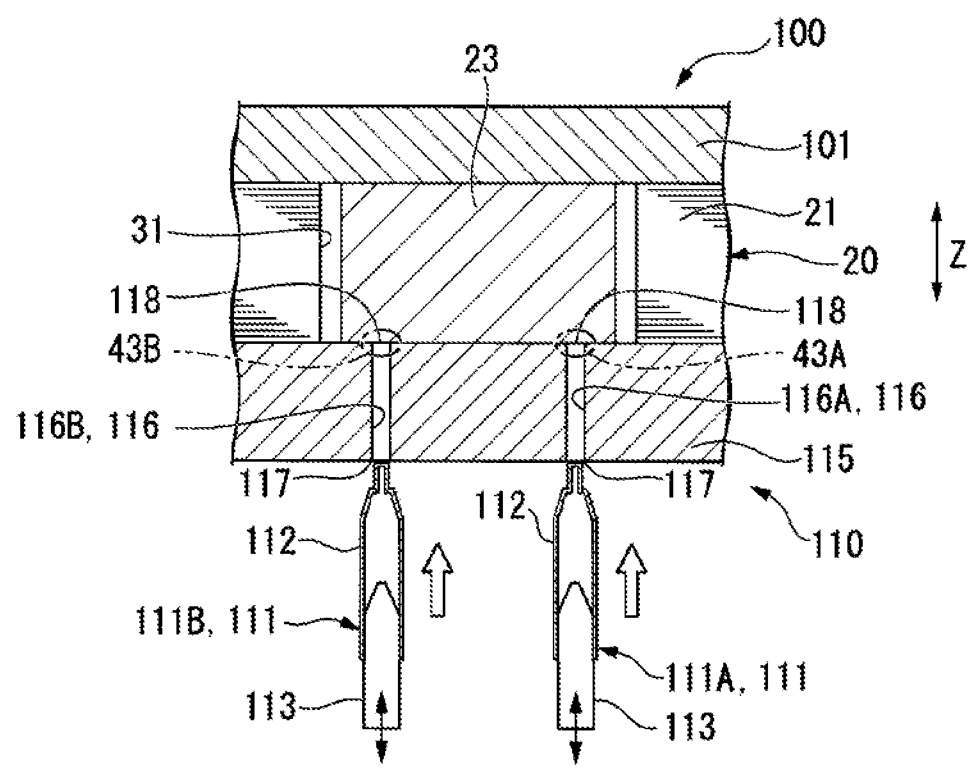
FIG. 7 illustrates the rotor manufacturing method according to the first embodiment.

In the rotor manufacturing method according to the first embodiment, the manufacturing apparatus 100, which is structured as described above, is used. FIGS. 6 and 7 are schematic side sectional views of the manufacturing apparatus 100 according to the first embodiment, illustrating the rotor manufacturing method according to the first embodiment. In the rotor manufacturing method according to the present embodiment, first, the magnet-insertion step S11 is performed. Referring to FIG. 6, in the magnet-insertion step S11, an end surface of the rotor core 21 in the axial direction is brought into contact with the core support unit 101, and the rotor core 21 is set in an accurately positioned state. Next, the magnet 23 is inserted into the slot 31 of the rotor core 21 in the axial direction. At this time, the magnet 23 may be disposed at any position in the magnet placement portion 35 (see FIG. 2) of the slot 31 when seen in the axial direction. Hereinafter, a case where the magnet 23 is disposed in such a way that the second side surface 23*b* is in contact with the outer wall 36 of the magnet placement portion 35 as illustrated in FIG. 5 will be described as an example. Thus, the magnet-insertion step S11 finishes.

Next, the fixing-material-injection step S13 is performed. In the fixing-material-injection step S13, as illustrated in FIG. 7, the filling die 115 is moved and pressed against the end surface of the rotor core 21 in the axial direction with a predetermined pressing force (clamped). Here, the filling die 115 is pressed with a pressing force such that the filling die 115 does not separate from the rotor core 21 due to the inner pressure of the fixing material 41 when the fixing material 41 is injected. Next, the ejection ports at the tips of the plungers 111A and 111B are inserted into the connection holes 117 of the filling die 115.

Next, the fixing material 41 is injected from the first fixing-material-injection portion 43A into the slot 31 by using the first plunger 111A, and the fixing material 41 is injected from the second fixing-material-injection portion 43B into the slot 31 by using the second plunger 111B. In the fixing-material-injection step S13 according to the present embodiment, the time for starting injection of the fixing material 41 into the slot 31 is made to differ between the first fixing-material-injection portion 43A and the second fixing-material-injection portion 43B of the slot 31.

Figure 8:
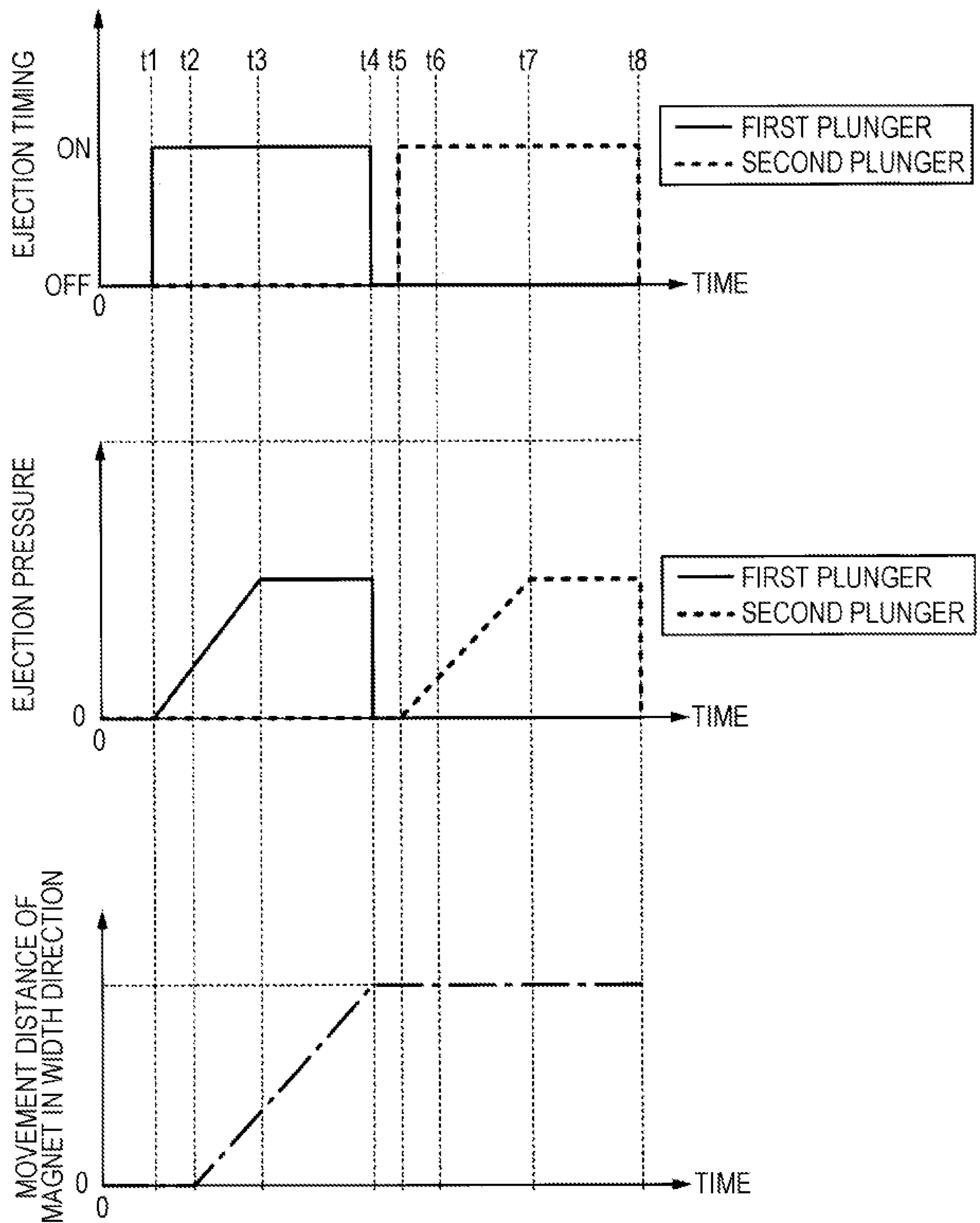
FIG. 8 is a timing chart of a fixing-material-injection step according to the first embodiment.
Figure 9:
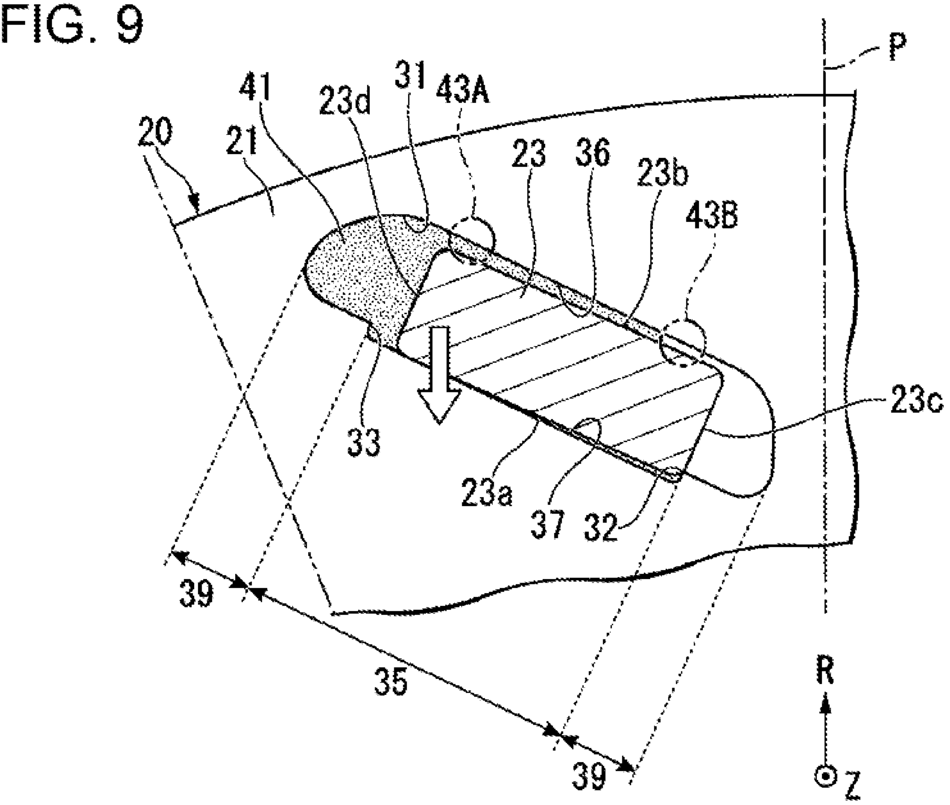
FIG. 9 illustrates the rotor manufacturing method according to the first embodiment.
Figure 10:
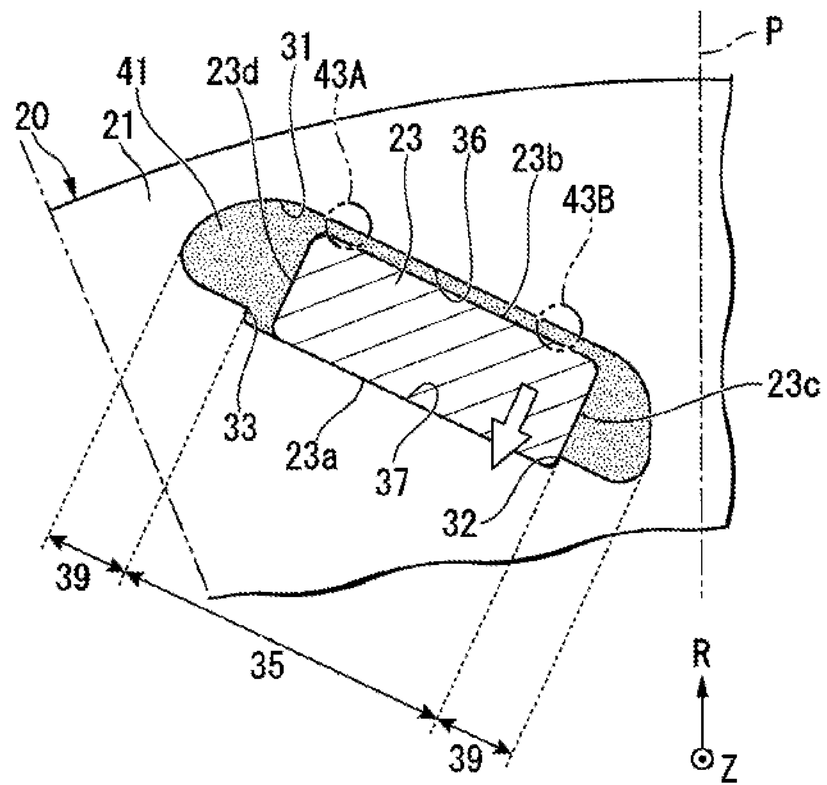
FIG. 10 illustrates the rotor manufacturing method according to the first embodiment.

FIG. 8 is a timing chart of the fixing-material-injection step according to the first embodiment. FIGS. 9 and 10 are partial plan views of the rotor core 21 when seen in the direction of arrow S in FIG. 4, illustrating the rotor manufacturing method according to the first embodiment. In the following descriptions with reference to the timing chart of FIG. 8, see FIG. 7 for the elements of the manufacturing apparatus 100. Referring to FIG. 8, first, ejection of the fixing material 41 by using the first plunger 111A is started at time t1. Then, the fixing material 41 ejected from the first plunger 111A flows through the first fixing-material channel 116A, and the ejection pressure of the first plunger 111A gradually increases. Subsequently, when the fixing material 41 elected from the first plunger 111A reaches the filling hole 110 at time t2, injection of the fixing material 41 from the first fixing-material-injection portion 43A into the slot 31 is started. The magnet 23 in the slot 31 is pushed by the fixing material 41 and becomes displaced in such a way that a part of the magnet 23 that is near the first fixing-material-injection portion 43A when seen in the axial direction separates from the first fixing-material-injection portion 43A.

To be specific, the fixing material 41 and the magnet 23 move as described below when injection of the fixing material 41 from the first fixing-material-injection portion 43A into the slot 31 is started. Referring to FIG. 9, the fixing material 41 injected from the first fixing-material-injection portion 43A flows into the space between the outer wall 36 of the magnet placement portion 35 of the slot 31 and a part of the second side surface 23*b* of the magnet 23 near an end of the second side surface 23*b* adjacent to the fourth side surface 23*d* in the width direction. Thus, one end portion of the magnet 23 in the width direction including the fourth side surface 23*d* is pushed by the fixing material 41 and moves toward the inner wall 37 of the magnet placement portion 35. The fixing material 41 injected from the first fixing-material-injection portion 43A flows out of the space between the outer wall 36 of the magnet placement portion 35 of the slot 31 and the second side surface 23*b* of the magnet 23 and flows into the flux barrier 39 located outside in the radial direction. When the fixing material 41 flows into the flux barrier 39, the magnet 23 is pushed by the fixing material 41 filling the flux barrier 39. Thus, the entirety of the magnet 23 moves in the longitudinal direction of the magnet placement portion 35 when seen in the axial direction.

Referring to FIGS. 8 and 9, at time t3, the ejection pressure of the first plunger 111A saturates. Subsequently, the first plunger 111A injects the fixing material 41 into the slot 31 until one end portion of the magnet 23 in the width direction including the fourth side surface 23*d* contacts the inner wall 37 of the magnet placement portion 35 and the magnet 23 contacts the first stepped surface 32 of the slot 31 at time t4. Then, ejection of the fixing material 41 by using the first plunger 111A is stopped, and injection of the fixing material 41 from the first fixing-material-injection portion 43A is complete.

Next, referring to FIG. 8, ejection of the fixing material 41 by using the second plunger 111B is started at time t5. Then, the fixing material 41 ejected from the second plunger 111B flows through the second fixing material channel 116B, and the ejection pressure of the second plunger 111B gradually increases. Subsequently, when the fixing material 41 elected from the second plunger 111B reaches the filling hole 118 at time t6, injection of the fixing material 41 from the second fixing-material-injection portion 43B into the slot 31 is started. Thus, the magnet 23 is pushed by the fixing material 41 and becomes displaced in such a way that a part of the magnet 23 that is near the second fixing-material-injection portion 43B when seen in the axial direction separates from the second fixing-material-injection portion 43B.

To be specific, the fixing material 41 and the magnet 23 move as described below when injection of the fixing material 41 from the second fixing-material-injection portion 43B into the slot 31 is started. Referring to FIG. 10, the fixing material 41 injected from the second fixing-material-injection portion 43B flows into the space between the outer wall 36 of the magnet placement portion 35 of the slot 31 and a part of the second side surface 23*b* of the magnet 23 near an end of the second side surface 23*b* adjacent to the third side surface 23*c* in the width direction. Thus, one end portion of the magnet 23 in the width direction including the third side surface 23*c* is pushed by the fixing material 41 and moves toward the inner wall 37 of the magnet placement portion 35. The fixing material 41 injected from the second fixing-material-injection portion 43B flow out out of the space between the outer wall 36 of the magnet placement portion 35 of the slot 31 and the second side surface 23*b* of the magnet 23 and flows into the flux barrier 39 located inside in the radial direction. However, because the flux barrier 39 located outside in the radial direction has been filled with the fixing material 41, even when the fixing material 41 flows into the flux barrier 39 inside in the radial direction, movement of the magnet 23 in the longitudinal direction of the magnet placement portion 35 when seen in the axial direction is restrained. Thus, the magnet 23 is accurately positioned in the longitudinal direction of the magnet placement portion 35 when seen in the axial direction.

Referring to FIGS. 8 and 10, at time t7, the ejection pressure of the second plunger 111B saturates. Subsequently, the second plunger 111B injects the fixing material 41 into the slot 31 until the other end portion of the magnet 23 in the width direction including the third side surface 23*c* contacts the inner wall 37 of the magnet placement portion 35 at time t8. Then, ejection of the fixing material 41 by using the second plunger 111B is stopped, and injection of the fixing material 41 from the second fixing-material-injection portion 43B is complete. Thus, the magnet 23 is accurately positioned in the transversal direction of the magnet placement portion 35 when seen in the axial direction. In this state, the first side surface 23*a* of the magnet 23 is in contact with the inner wall 37 of the magnet placement portion 35 of the slot 31, and the third side surface 23*c* of the magnet 23 is in contact with the first stepped surface 32 of the slot 31. Thus, the fixing-material-injection step S13 finishes.

Next, the solidification step S15 is performed. In the solidification step S15, the fixing material 41 in the slot 31 is naturally cooled and solidified. Thus, the magnet 23 is fixed to the rotor core 21. Then, the solidification step S15 finishes.

As described above, in the rotor manufacturing method and the manufacturing apparatus 100 according to the present embodiment, the time for starting injection of the fixing material 41 into the slot 31 is made to differ between the first fixing-material-injection portion 43A and the second fixing-material-injection portion 43B. Thus, in the fixing-material-injection step S13, because the fixing-material-injection unit 110 injects the fixing material 41 from the fixing-material-injection portions 43A and 43B, the magnet 23 can be pushed by the fixing material 41 in the slot 31 and the magnet 23 can be moved so as to be separated from the fixing-material-injection portions 43A and 43B in the slot 31. Therefore, when the fixing material 41 is injected in the same way from the pair of fixing-material-injection portions 43A and 43B, the magnet 23 is pushed in the same way by the fixing material 41 injected from the fixing-material-injection portions 43A and 43B. Thus, the magnet 23 can be moved in a direction perpendicular to the direction in which the pair of fixing-material-injection portions 43A and 43B are arranged. When the time for injecting the fixing material 41 is made to differ between the pair of fixing-material-injection portions 43A and 43B and the fixing material 41 is injected from the pair of fixing-material-injection portions 43A and 43B, a force with which the magnet 23 is pushed by the fixing material 41 injected from the first fixing-material-injection portion 43A and at force with which the magnet 23 is pushed by the fixing material 41 injected from the second fixing-material-injection portion 43B differ from each other. Thus, the magnet 23 can be moved in both of the direction perpendicular to the direction in which the pair of fixing-material-injection portions 43A and 43B are arranged and the direction in which the pair of fixing-material-injection portions 43A and 43B are arranged. Accordingly, the magnet 23 can be fixed at any appropriate position.

The fixing-material-injection unit 110 includes the first plunger 111A, which supplies the fixing material 41 to the first fixing-material-injection portion 43A, and the second plunger 111B, which supplies the fixing material 41 to the second fixing-material-injection portion 43B. The fixing material 41 is injected from the first fixing-material-injection portion 43A by using the first plunger 111A, and the fixing material 41 is injected from the second fixing-material-injection portion 43B by using the second plunger 111B. Therefore, by independently controlling the first plunger 111A and the second plunger 111B, the time for starting injection of the fixing material 41 can be made to differ between the first fixing-material-injection portion 43A and the second fixing-material-injection portion 43B. Accordingly, the magnet 23 can be easily fixed at any appropriate position.

In the fixing-material-injection step S13, after injection of the fixing material 41 from the first fixing-material-injection portion 43A is complete, injection of the fixing material 41 from the second fixing-material-injection portion 43B is started. With this method, before injecting the fixing material 41 from the second fixing-material-injection portion 43B, a region in the slot 31 near the first fixing-material-injection portion 43A can be filled with the fixing material 41 by injecting the fixing material 41 from the first fixing-material-injection portion 43A, and the magnet 23 can be maximally moved in the slot 31 in the direction in which the first fixing-material-injection portion 43A and the second fixing-material-injection portion 43B are arranged. Thus, when the fixing material 41 is injected from the second fixing-material-injection portion 43B, due to the presence of the fixing material 41 that fills the region in the slot 31 near the first fixing-material-injection portion 43A, movement of the magnet 23 in the direction in which the first fixing-material-injection portion 43A and the second fixing-material-injection portion 43B are arranged is restrained. Thus, the magnet 23 can be fixed in a state in which the magnet 23 is in close contact with the inner surface of the slot 31 in the direction in which the first fixing-material-injection portion 43A and the second fixing-material-injection portion 43B are arranged.

With the rotor manufacturing method and the rotor manufacturing apparatus 100 according to the present embodiment, the magnet 23 can be fixed at a position in the magnet placement portion 35 of the slot 31 inside in the radial direction. Therefore, the fixing material 41 can be interposed between a part of the magnet 23 facing outward in the radial direction (the second side surface 23*b* and the fourth side surface 23*d*) and the inner surface of the slot 31. Thus, when the rotor 20 rotates and a centrifugal force acts on the magnet 23, the fixing material 41 can support the magnet 23. Accordingly, it is possible to prevent damage that may occur if the magnet 23 contacts the inner surface of the slot 31 due to the centrifugal force.

In the first embodiment, after injection of the fixing material 41 from the first fixing-material-injection portion 43A is complete, injection of the fixing material 41 from the second fixing-material-injection portion 43B is started. However, this is not a limitation. For example, as in a modification of the first embodiment described below, the time for starting injection of the fixing material 41 from the second fixing-material-injection portion 43B may be determined on the basis of the pressure value of the fixing material 41 in the first fixing-material-injection portion 43A. In the rotor manufacturing method according to the modification of the first embodiment, the manufacturing apparatus 100 according to the first embodiment described above is used.

In the fixing-material-injection step S13 according to the modification of the first embodiment, after starting injection of the fixing material 41 from the first fixing-material-injection portion 43A, injection of the fixing material 41 from the second fixing-material-injection portion 43B is started with a time lag, while continuing injection of the fixing material 41 from the first fixing-material-injection portion 43A.

Figure 11:
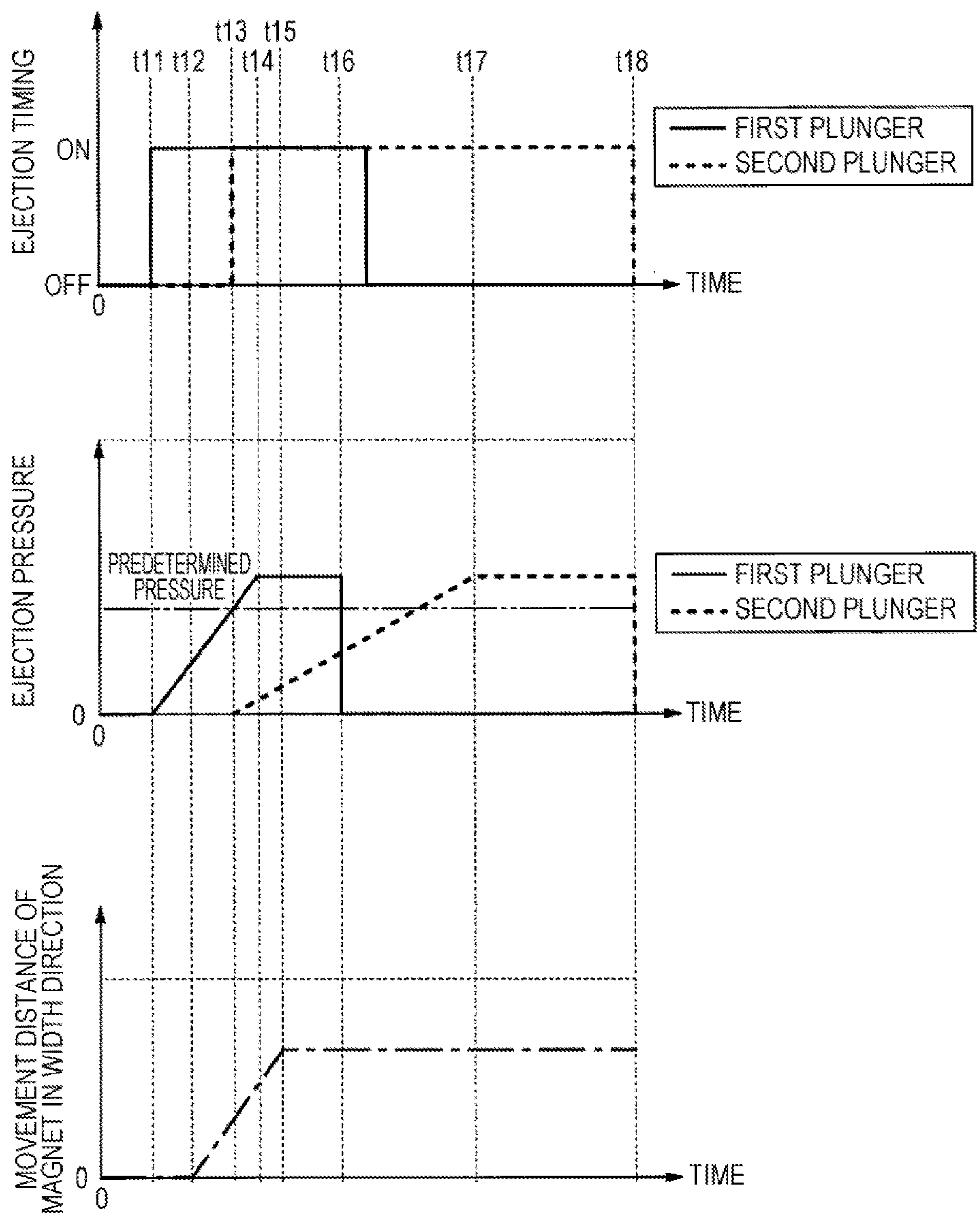
FIG. 11 is a timing chart of a fixing-material-injection step according to a modification of the first embodiment.
Figure 12:
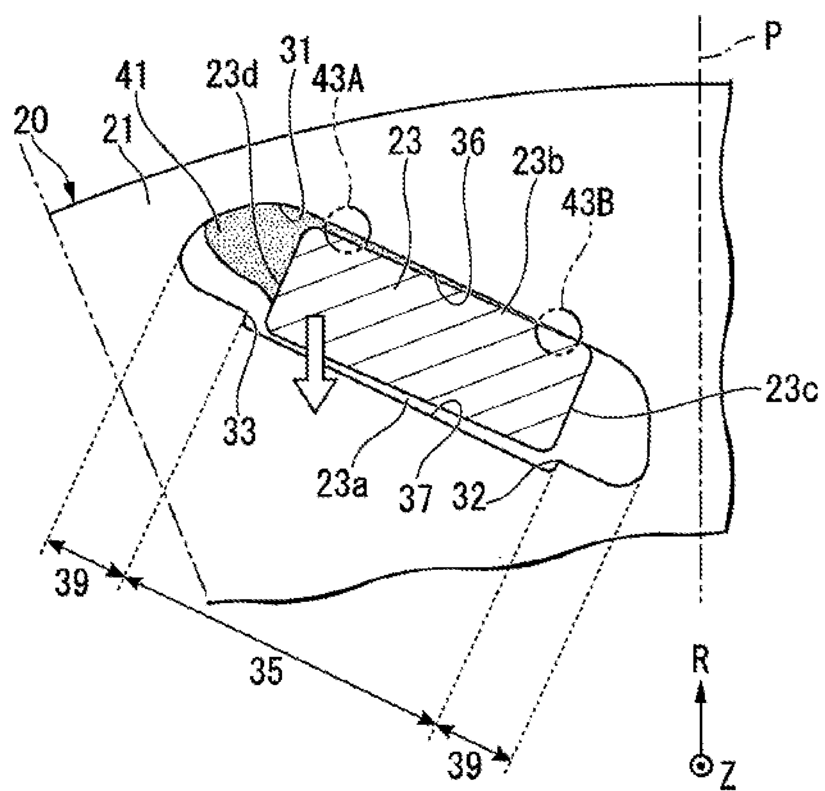
FIG. 12 illustrates a rotor manufacturing method according to a modification of the first embodiment.
Figure 13:
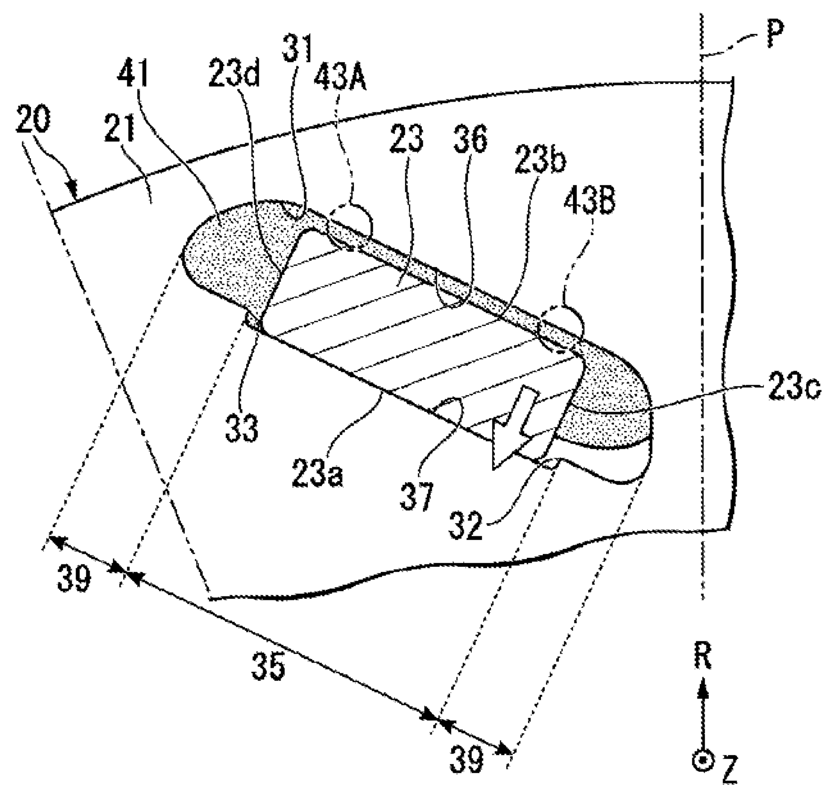
FIG. 13 illustrates the rotor manufacturing method according to the modification of the first embodiment.

FIG. 11 is a timing chart of the fixing-material-injection step according to the modification of the first embodiment. FIGS. 12 and 13 are partial plan views of a rotor core when seen in the direction of arrow S in FIG. 4, illustrating the rotor manufacturing method according to the modification of the first embodiment. In the following description with reference to the timing chart of FIG. 11, refer to FIG. 7 for the elements of the manufacturing apparatus 100. Referring to FIG. 11, in the fixing-material-injection step S13 according to the modification of the first embodiment, first, ejection of the fixing material 41 by using the first plunger 111A is started at time t11. Then, the fixing material 41 ejected from the first plunger 111A flows through the first fixing material channel 116A, and the ejection pressure of the first plunger 111A gradually increases. Subsequently, when the fixing material 41 ejected from the first plunger 111A reaches the filling hole 118 at time t12, injection of the fixing material from the first fixing-material-injection portion 43A into the slot 31 is started. Thus, the magnet 23 disposed in the slot 31 is pushed by the fixing material 41 and becomes displaced in such a way that a part of the magnet 23 near the first fixing-material-injection portion 43A when seen in the axial direction separates from the first fixing-material-injection portion 43A (see FIG. 12). Movements of the fixing material 41 and the magnet 23 are the same as those described above in the first embodiment.

Next, when the ejection pressure of the first plunger 111A reaches a predetermined pressure value at time t13, injection of the fixing material 41 by using the second plunger 111B is started. Then, the fixing material 41 ejected from the second plunger 111B flows through the second fixing material channel 116B, and the ejection pressure of the second plunger 111B gradually increases. Note that, in the present modification, the pressure value of the fixing material 41 in the first fixing-material-injection portion 43A is calculated by using the ejection pressure of the first plunger 111A. Subsequently, when the fixing material 41 ejected from the second plunger 111B reaches the filling hole 118 at time t15, injection of the fixing material 41 from the second fixing-material-injection portion 43B into the slot 31 is started. Thus, the magnet 23 is pushed by the fixing material 41 and becomes displaced in such a way that a part of the magnet 23 near the second fixing-material-injection portion 43B when seen in the axial direction separates from the second fixing-material-injection portion 43B (see FIG. 13). In the example illustrated in FIG. 11, the ejection pressure of the first plunger 111A saturates at time t14, which is between time t13 and time t15.

Time t15 is set to be a time before the magnet 23 contacts the first stepped surface of the slot 31, as illustrated in FIG. 12. After time t15, because the fixing material 41 is injected from both of the first fixing-material-injection portion 43A and the second fixing-material-injection portion 43B into the slot 31, movement of the magnet 23 in the longitudinal direction of the magnet placement portion 35 when seen in the axial direction stops. As a result, at time t15, the magnet 23 is accurately positioned in the longitudinal direction of the magnet placement port 35 when seen in the axial direction.

Subsequently, injection of the fixing material 41 from the first fixing-material portion 43A is continued, until one end portion of the magnet 23 in the width direction including the fourth side surface 23*d* contacts the inner wall 37 of the magnet placement portion 35 at time t16. Then, ejection of the fixing material 41 by using the first plunger 111A is stopped, and injection of the fixing material 41 from the first fixing-material-injection portion 43A is complete. At time t17, the ejection pressure of the second plunger 111B saturates. Subsequently, the fixing material 41 is injected into the slot 31, until the other end portion of the magnet 23 in the width direction including the third side surface 23*c* contacts the inner wall 37 of the magnet placement portion 35 at time t18. Then, ejection of the fixing material 41 by using the second plunger 111B is stopped, and injection of the fixing material 41 from the second fixing-material-injection portion 43B is complete. Thus, the magnet 23 is accurately positioned in the transversal direction of the magnet placement portion 35 when seen in the axial direction.

Thus, in the magnet placement portion 35 of the slot 31, the magnet 23 can be disposed at any appropriate position in the longitudinal direction of the magnet placement portion 35 when seen in the axial direction. In this state, the first side surface 23*a* of the magnet 23 is in contact with the inner wall 37 of the magnet placement portion 35 of the slot 31, and the magnet 23 is located at the center of the magnet placement portion 35 in the longitudinal direction when seen in the axial direction.

Thus, with the rotor manufacturing method according to the present modification, after starting injection of the fixing material 41 from the first fixing-material-injection portion 43A, injection of the fixing material 41 from the second fixing-material-injection portion 43B is started with a time lag, while continuing injection of the fixing material 41 from the first fixing-material-injection portion 43A. With this method, after injection of the fixing material 41 from the first fixing-material-injection portion 43A is started and before the magnet 23 is maximally moved in the slot 31 in the direction in which the first fixing-material-injection portion 43A and the second fixing-material-injection portion 43B are arranged, the fixing material 41 can be injected from the second fixing-material-injection portion 43B. Thus, the magnet 23 can be fixed at any appropriate position in the direction in which the first fixing-material-injection portion 43A and the second fixing-material-injection portion 43B are arranged.

In the present modification, the time for starting injection of the fixing material 41 from the second fixing-material-injection portion 43B is determined on the basis of the pressure value of the fixing material 41 in the first fixing-material-injection portion 43A. Because the pressure value of the fixing material 41 in the first fixing-material-injection portion 43A depends on the amount of the fixing material 41 injected from the first fixing-material-injection portion 43A, the repeatability of the fixing-material-injection step S13 can be improved. Accordingly, it is possible to manufacture the rotors 20 with small variations.

With the rotor manufacturing method according to the present modification, the magnet 23 can be fixed to the central position of the magnet placement portion 35 in the longitudinal direction of the magnet placement portion 35 when seen in the axial direction. Thus, the fixing material 41 can be interposed between the third side surface 23*c* of the magnet 23 and the first stepped surface 32 of the slot 31 and between the fourth side surface 23*d* of the magnet 23 and the second stepped surface 33 of the slot 31. Therefore, by adjusting the position of the magnet 23 and adjusting the amount of the fixing material 41 interposed between the magnet 23 and the stepped surfaces 32 and 33, it is possible to adjust a stress that the stepped surfaces 32 and 33 of the slot 31 receive from the magnet 23 when a centrifugal force acts on the magnet 23.

In the first embodiment, the time for starting injection of the fixing material 41 into the slot 31 is made to differ between the fixing-material-injection portion 43A and the second fixing-material-injection portion 43B. However, this is not a limitation. For example, the speed at which the fixing material 41 is injected into the slot 31 may be made to differ between the first fixing-material-injection portion 43A and the second fixing-material-injection portion 43B. In this case, a force with which the magnet 23 is pushed by the fixing material 41 injected from the first fixing-material-injection portion 43A and a force with which the magnet 23 is pushed by the fixing material 41 injected from the second fixing-material-injection portion 43B differ from each other. Thus, the magnet 23 can be moved in both of the direction perpendicular to the direction in which the pair of fixing-material-injection portions 43A and 43B are arranged and the direction in which the pair of fixing-material-injection portions 43A and 43B are arranged. Accordingly, as with the first embodiment, the magnet 23 can be fixed at any appropriate position.

The amount of the fixing material 41 injected into the slot 31 may be made to differ between the first fixing-material-injection portion 43A and the second fixing-material-injection portion 43B. In this case, a distance that the magnet 23 moves by being pushed by the fixing material 41 injected from the first fixing-material-injection portion 43A and a distance that the magnet 23 moves by being pushed by the fixing material 41 injected from the second fixing-material-injection portion 43B differ from each other. Thus, the magnet 23 can be moved in both of the direction perpendicular to the direction in which the pair of fixing-material-injection portions 43A and 43B are arranged and the direction in which the pair of fixing-material-injection portions 43A and 43B are arranged. Accordingly, as with the first embodiment, the magnet 23 can be fixed at any appropriate position. At least two or all of the time for starting injection of the fixing material 41, the speed at which the fixing material 41 is injected, and the amount of the fixing material 41 injected may be made to differ between the first fixing-material-injection portion 43A and the second fixing-material-injection portion 43B.

Second Embodiment

In the first embodiment, the fixing material 41 is injected from the first fixing-material-injection portion 43A into the slot 31 by using the first plunger 111A, and the fixing material 41 is injected from the second fixing-material-injection portion 43B into the slot 31 by using the second plunger 111B. A second embodiment differs from the first embodiment in that the fixing material 41 is injected from both of the first fixing-material-injection portion 43A and the second fixing-material-injection portion 43B into the slot 31 by using one plunger 111.

Figure 14:
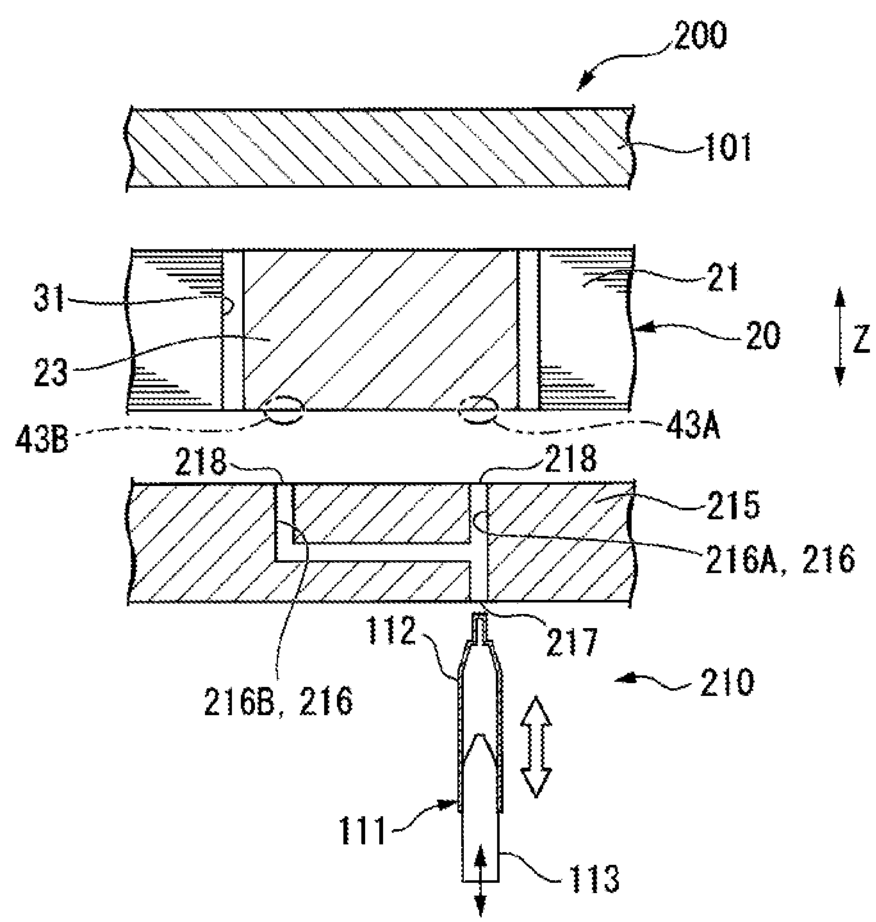
FIG. 14 is a schematic side sectional view of a rotor manufacturing apparatus according to a second embodiment.

FIG. 14 is a schematic side sectional view of a rotor manufacturing apparatus 200 according to the second embodiment. The rotor manufacturing apparatus 200 according to the present embodiment includes a core support unit 101 and a fixing-material-injection unit 210. The fixing-material-injection unit 210 includes a plunger 111 and a filling die 215. The plunger 111 includes a cylinder 112 and a piston 113. The plunger 111 supplies the fixing material 41 to both of the first fixing-material-injection portion 43A and the second fixing-material-injection portion 43B.

Fixing material channels 216 are formed in the filling die 215. The fixing material channels 216 have a connection hole 217 and filling holes 218. The fixing material channels 216 include a first fixing-material channel 216A, which extends from the plunger 111 to the first fixing-material-injection portion 43A; and a second fixing material channel 216B, which extends from the plunger 111 to the second fixing-material-injection portion 43B. The fixing material 41 ejected from the plunger 111 flows through the first fixing-material channel 216A. The fixing material 41 ejected from the plunger 111 flows through the second fixing material channel 216B. The first fixing-material channel 216A and the second fixing material channel 216B share the connection hole 217. That is, the first fixing-material channel 216A and the second fixing material channel 216B branch off from a channel that extends from the upstream side toward the downstream side. When injecting the fixing material 41, an ejection opening at the tip of the plunger 111 is connected to the connection hole 217.

The cross-sectional area of the first fixing-material channel 216A is the same as the cross-sectional area of the second fixing material channel 216B. The length of the first fixing-material channel 216A is smaller than the length of the second fixing material channel 216B. That is, the lengths of the fixing material channels 216 from the plunger 111 to the fixing-material-injection portions 43A and 43B differ between the fixing-material-injection portions 43A and 43B. In the present embodiment, the first fixing-material channel 216A extends linearly from the connection hole 217 toward one of the filling holes 218. In contrast, the second fixing material channel 216B is bent substantially at right angles at a plurality of positions between the connection hole 217 and the other filling hole 218.

Next, a fixing-material-injection step S13 of a rotor manufacturing method using the manufacturing apparatus 200 according to the present embodiment will be described. Detailed descriptions that are the same as those of the fixing-material-injection step S13 of the first embodiment will be omitted. In the fixing-material-injection step S13 according to the second embodiment, the lengths of the fixing material channels 216 from the plunger 111 to the fixing-material-injection portions 43A and 43B are made to differ between the fixing-material-injection portions 43A and 43B. Moreover, in the fixing-material-injection step S13 according to the present embodiment, the time for starting injection of the fixing material 41 into the slot 31 is made to differ between the first fixing-material-injection portion 43A and the second fixing-material-injection portion 43B of the slot 31.

In the fixing-material-injection step S13 according to the present embodiment, the ejection opening at the tip of the plunger 111 is inserted into the connection hole 217 of the filling die 215. Next, ejection of the fixing material 41 by using the plunger 111 is started. Then, the fixing material 41 ejected from the plunger 111 flows through the first fixing-material channel 216A and the second fixing material channel 216B. The length of the first fixing-material channel 216A is smaller than the length of the second fixing material channel 216B. Therefore, the fixing material 41 ejected from the plunger 111 first flows from the first fixing-material-injection portion 43A into the slot 31, and, with a time lag, the fixing material 41 flows from the second fixing-material-injection injection portion 43B into the slot 31. Thus, in the fixing-material-injection step S13 according to the present embodiment, after starting injection of the fixing material 41 from the first fixing-material-injection portion 43A, injection of the fixing material 41 from the second fixing-material-injection portion 43B is started with a time lag, while continuing injection of the fixing material 41 from the first fixing-material-injection portion 43A. Because pressure loss differs between the fixing material channels 216A and 216B, the speed at which the fixing material 41 is injected into the slot 31 and the amount of the fixing material 41 injected into the slot 31 differ between the first fixing-material-injection portion 43A and the second fixing-material-injection portion 43B.

As the described above, in the present embodiment, the lengths of the fixing material channels 216 differ between the fixing-material-injection portions 43A and 43B. Thus, the time for supplying the fixing material 41 from the plunger 111 to the fixing-material-injection portions 43A and 43B can be made to differ between the fixing-material-injection portions 43A and 43B. Moreover, because pressure loss differs between the fixing material channels 216A and 216B, in the fixing-material-injection step S13, the speed at which the fixing material 41 is injected and the amount of the fixing material 41 injected can be made to differ between the fixing-material-injection portions 43A and 43B. Accordingly, by appropriately setting the lengths of the fixing material channels 216, the magnet 23 can be easily fixed at any appropriate position.

The fixing-material-injection unit 210 includes the plunger 111, which supplies the fixing material 41 to both of the first fixing-material-injection portion 43A and the second fixing-material-injection portion 43B. Therefore, the number of plungers of the fixing-material-injection unit 210 can be reduced, compared with a case where the fixing-material-injection unit includes a plunger for supplying the fixing material 41 to the first fixing-material-injection portion 43A and another plunger for supplying the fixing material 41 to the second fixing-material-injection portion 43B. Accordingly, it is possible to reduce the number of components of the fixing-material-injection unit 210 and to provide the rotor manufacturing apparatus 200 at a low cost.

Figure 15:
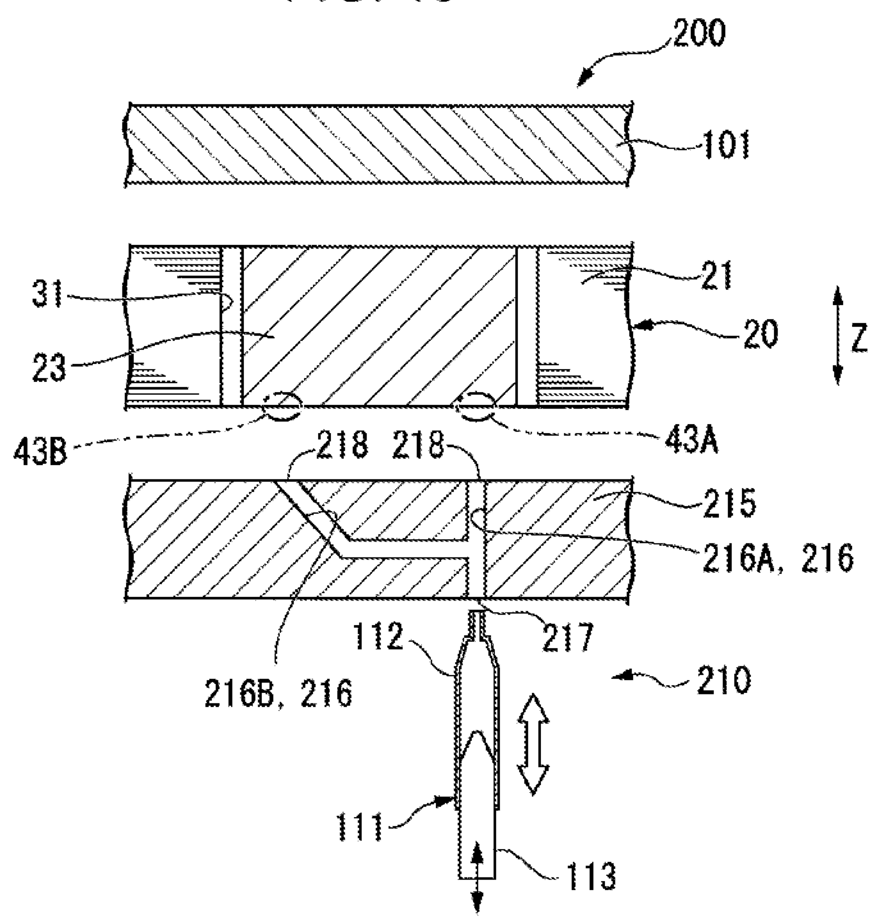
FIG. 15 is a schematic side sectional view of a rotor manufacturing apparatus according to a modification of the second embodiment.

The shape of the second fixing material channel 216B is not limited to the shape shown in FIG. 14. For example, as illustrated in FIG. 15, the second fixing material channel 216B may be bent at a position between the connection hole 217 and one of the filling holes 218 so as to extend from the position at an angle relative to the first fixing-material channel 216A.

Third Embodiment

In the second embodiment, the cross-sectional areas of the fixing material channels 216A and 216B are the same for the fixing-material-injection portions 43A and 43B. A third embodiment differs from the second embodiment in that the cross-sectional areas of fixing material channels 316A and 316B differ between the fixing-material-injection portions 43A and 43B.

Figure 16:
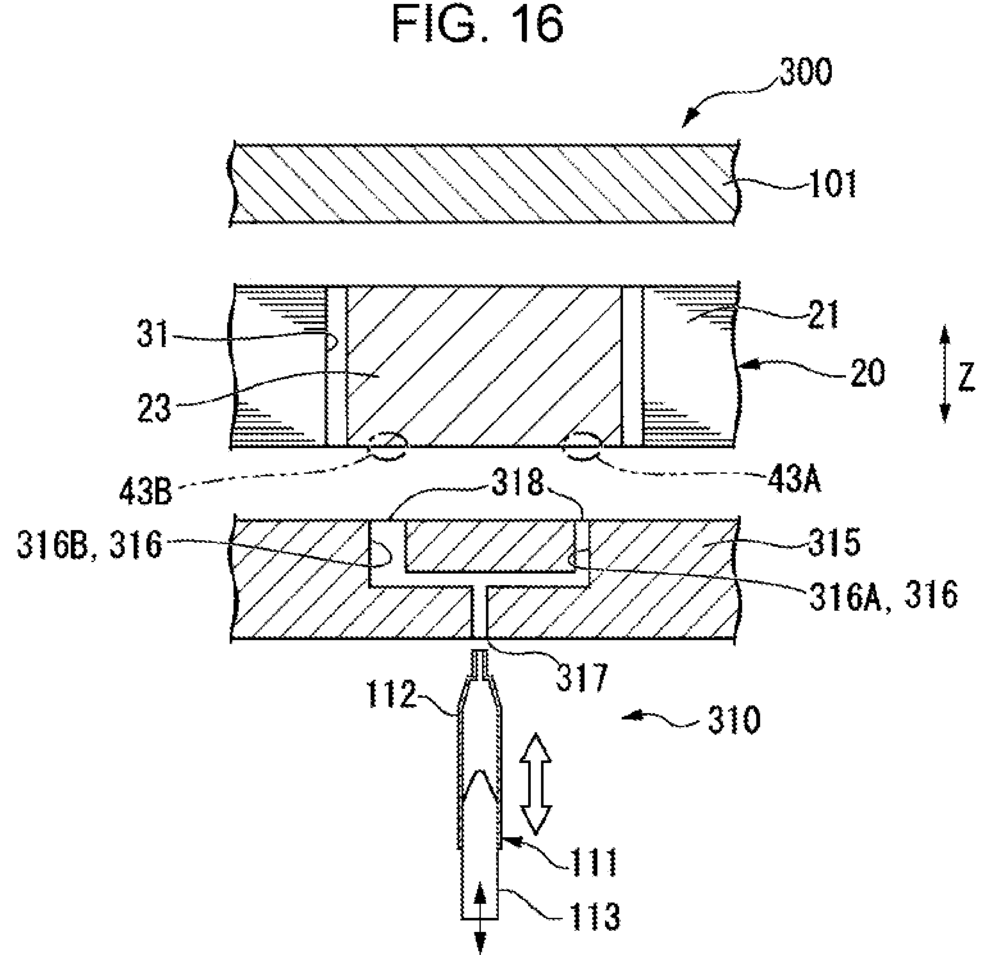
FIG. 16 is a schematic side sectional view of a rotor manufacturing apparatus according to a third embodiment.

FIG. 16 is a schematic side sectional view of a rotor manufacturing apparatus 300 according to the third embodiment. The rotor manufacturing apparatus 300 according to the present embodiment includes a core support unit 101 and a fixing-material-injection unit 310. The fixing-material-injection unit 310 includes a plunger 111 and a filling die 315.

Fixing material channels 316 are formed in the filling die 315. The fixing material channels 316 have a connection hole 317 and filling holes 318. The fixing material channels 316 include a first fixing-material channel 316A, which extends from the plunger 111 to the first fixing-material-injection portion 43A; and a second fixing material channel 316B, which extends from the plunger 111 to the second fixing-material-injection portion 43B. The fixing material 41 ejected from the plunger 111 flows through the first fixing-material channel 316A. The fixing material 41 ejected from the plunger 111 flows through the second fixing material channel 316B. The first fixing-material channel 316A and the second fixing material channel 316B share the connection hole 317. That is, the first fixing-material channel 316A and the second fixing material channel 316B branch off from a channel that extends from the upstream side toward the downstream side. When injecting the fixing material 41, an electron opening at the tip of the plunger 111 is connected to the connection hole 317.

The cross-sectional area of the second fixing material channel 316B is larger than the cross-sectional area of the first fixing-material channel 316A. That is, the cross-sectional areas of the fixing material channels 316A and 316B differ between the fixing-material-injection portions 43A and 43B. The length of the first fixing-material channel 316A is the same as the length of the second fixing material channel 216B.

Next, a fixing-material-injection step S13 of a rotor manufacturing method using the manufacturing apparatus 300 according to the present embodiment will be described. Detailed descriptions that are the same as those of the fixing-material-injection step S13 of the second embodiment will be omitted. In the fixing-material-injection step S13 according to the third embodiment, the cross-sectional areas of the fixing material channels 316A and 316B from the plunger 111 to the fixing-material-injection portions 43A and 43B are made to differ between the fixing-material-injection portions 43A and 43B. Moreover, in the fixing-material-injection step S13 according to the present embodiment, the time for starting injection of the fixing material 41 into the slot 31 is made to differ between the first fixing-material-injection portion 43A and the second fixing-material-injection portion 43B of the slot 31.

In the fixing-material-injection step S13 according to the present embodiment, the ejection opening at the tip of the plunger 111 is inserted into the connection hole 317 of the filling die 315. Next, ejection of the fixing material 41 by using the plunger 111 is started. Then, the fixing material 41 ejected from the plunger 111 flows through the first fixing-material channel 316A and the second fixing material channel 316B. The cross-sectional area of the first fixing-material channel 316A is smaller than the cross-sectional area of the second fixing material channel 316B. Therefore, the fixing material 41 ejected from the plunger 111 first flows from the first fixing-material-injection portion 43A into the slot 31, and, with a time lag, the fixing material 41 flows from the second fixing-material-injection portion 43B into the slot 31. Thus, in the fixing-material-injection step S13 according to the present embodiment, after starting injection of the fixing material 41 from the first fixing-material-injection portion 43A, injection of the fixing material 41 from the second fixing-material-injection portion 43B is started with a time lag, while continuing injection of the fixing material 41 from the first fixing-material-injection portion 43A. Because pressure loss differs between the fixing material channels 316A and 316B, the speed at which the fixing material 41 is injected into the slot 31 and the amount of the fixing material 41 injected into the slot 31 differ between the first fixing-material-injection portion 43A and the second fixing-material-injection portion 43B.

As described above, in the present embodiment, the cross-sectional areas of the fixing material channels 316A and 316B differ between the fixing-material-injection portions 43A and 43B. Thus, the time for supplying the fixing material 41 from the plunger 111 to the fixing-material-injection portions 43A and 43B can be made to differ between the fixing-material-injection portions 43A and 43B. Moreover, because pressure loss differs between the fixing material channels 316A and 316B, in the fixing-material-injection step S13, the speed at which the fixing material 41 is injected and the amount of the fixing material 41 injected can be made to differ between the fixing-material-injection portions 43A and 43B. Accordingly, the magnet 23 can be easily fixed at any appropriate position.

The present disclosure is not limited to the embodiments described above with reference to the drawings, which may be modified in various ways within the technical scope of the present disclosure. For example, in the embodiments described above, the fixing-material-injection portions 43A and 43B are set at positions that are in one end opening of the slot 31 and that overlap the outer wall 36 of the magnet placement portion 35. However, this is not a limitation. Fixing-material-injection portions may be set, for example, at positions that are in one end opening of the slot 31 and that overlap the flux barriers 39. There may be three or more fixing-material-injection portions.

In an end surface of the rotor core 21, a recess for guiding the fixing material into the slot may be formed. In the inner surface of the slot, a groove that extends in the axial direction and guides the fixing material in the axial direction in the slot may be formed.

In the first embodiment, the channel lengths of the fixing material channels are the same. However, this not a limitation. That is, in a structure in which one plunger is provided for each of the fixing-material-injection portions, the channel lengths of the fixing material channels may differ between the fixing-material-injection port. In this case, because pressure loss differs between the fixing material channels, the speed at which the fixing material is injected and the amount of fixing material injected can be made to differ between the first fixing-material-injection portions. The same applies to the cross-sectional areas of the fixing material channels.

Some of the elements of the embodiments described above may be replaced with known elements within the scope of the present disclosure, and the embodiments and the modifications described above may be used in combination.

What is claimed is:

1. A rotor manufacturing method for manufacturing a rotor that comprises a rotor core and a magnet inserted into a slot formed in the rotor core, the method comprising:

a magnet-insertion step of inserting the magnet into the slot; and a fixing-material-injection step of setting each of a plurality of fixing-material-injection portions to a position that overlaps an outer wall of the slot, and injecting a fixing material into a space between an inner surface of the slot and the magnet via the plurality of fixing-material-injection portions opened to the space in the slot, wherein, in the fixing-material-injection step, at least one of: a time for starting the injection of the fixing material into the slot; a speed at which the fixing material is injected into the slot; and an amount of the fixing material injected into the slot is made to differ from one another among the plurality of fixing-material-injection portions so as to move the magnet in two different directions in the slot.

2. The rotor manufacturing method according to claim 1, wherein, in the fixing-material-injection step, the fixing material is injected from one of the fixing-material-injection portions by using a first fixing-material-supply device that supplies the fixing material to the one of the fixing-material-injection portions, and the fixing material is also injected from another one of the fixing-material-injection portion by using a second fixing-material-supply device that supplies the fixing material to the another one of the fixing-material-injection portions.

3. The rotor manufacturing method according to claim 1, wherein, in the fixing-material-injection step, on the basis of a pressure value of the fixing material in one of the fixing-material-injection portions, the time for starting the injection of the fixing material from another one of the fixing-material-injection portions is determined.

4. The rotor manufacturing method according to claim 1, wherein, in the fixing-material-injection step, after the injection of the fixing material from one of the fixing-material-injection portions is complete, the injection of the fixing material from another one of the fixing-material-injection portions is started.

5. The rotor manufacturing method according to claim 1, wherein in the fixing-material-injection step, the fixing material is supplied by fixing-material-supply devices via fixing material channels defined with lengths from the fixing-material-supply devices to the corresponding fixing-material-injection portions, and wherein the lengths of fixing material channels are made to differ from one another among the fixing-material-injection portions.

6. The rotor manufacturing method according to claim 1, wherein in the fixing-material-injection step, the fixing material is supplied by fixing-material-supply devices via fixing material channels extending from the fixing-material-supply device to the corresponding fixing-material-injection portions, and wherein cross-sectional areas of the fixing material channels are made to differ from one another among the fixing-material-injection portions.

7. The rotor manufacturing method according to claim 1, wherein one of the two different directions is a direction in which the magnet is moved away from the fixing-material-injection portions in the slot.

8. The rotor manufacturing method according to claim 1, wherein the slot has a magnet placement portion in which the magnet is placed, each of the plurality of fixing-material-injection portions being set at the position that overlaps the outer wall of the magnet placement portion.

* * * * *